United States Patent

Tada

[15] 3,662,346

[45] May 9, 1972

[54] INFORMATION OUTPUT SYSTEM

[72] Inventor: Kiyoyuki Tada, Kyoto-fu, Japan

[73] Assignee: Sanyo Electric Company Ltd., Osaka-fu, Japan

[22] Filed: Jan. 20, 1970

[21] Appl. No.: 4,344

[30] Foreign Application Priority Data

Feb. 15, 1969 Japan ..................................44/11309
Oct. 17, 1969 Japan ..................................44/83372

[52] U.S. Cl. ..................................340/172.5
[51] Int. Cl. ..................................G06f 3/14
[58] Field of Search ..................................235/164; 340/172.5

[56] References Cited

UNITED STATES PATENTS

| | | | |
|---|---|---|---|
| 3,346,850 | 10/1967 | Wehrig | 340/172.5 |
| 3,374,467 | 3/1968 | Cast et al. | 340/172.5 |
| 3,375,498 | 3/1968 | Scuitto et al. | 340/172.5 |
| 3,492,656 | 1/1970 | Hildebrandt | 340/172.5 |

*Primary Examiner*—Harvey E. Springborn
*Attorney*—Irons, Sears, Staas, Halsey and Santorelli

[57] ABSTRACT

Numerical information, such as a decimal number, is registered in a main shift register for recirculation therethrough. The existence of non-zero decimal digits in a predetermined span of fixed digit positions within the main register is detected by logic means coupling the main register to an auxiliary shift register. The two registers are shifted in synchronism to the extent that a shift through one digit position in one of the registers is accompanied by a shift through one digit position in the other register; although a digit position in one register may be a decimal digit position occupied by several binary digit, or bit, positions, whereas a digit position in the other may be a single bit position. During recirculation of the contents of the main register, a fixed pattern of information representative of the digit positions occupied in that register by the entire decimal number registered therein is ultimately generated in the auxiliary register by the logic means, as a function of the preliminary pattern generated in the auxiliary register during early circulation of the contents of the main register. This fixed pattern of information is utilized to suppress undesired "zeroes" in digit positions exceeding the most significant digit of the actual registered decimal number during visual readout of that number. An additional counter circuit coupled to this system allows suppression of the undesired zeroes while simultaneously indicating the location of the decimal point.

15 Claims, 16 Drawing Figures

INVENTOR
KIYOYUKI TADA

BY Burfsky, Staas, Breiner & Halsey
ATTORNEYS

| | $T_1$ | $T_2$ | $T_3$ | $T_4$ | $T_5$ | $T_6$ | $T_7$ | $T_8$ | $T_9$ | $T_{10}$ | $T_{11}$ | $T_{12}$ | $T_{13}$ | $T_{14}$ | $T_{15}$ | $T_{16}$ | $T_{17}$ | $T_{18}$ | $T_{19}$ | $T_{20}$ | $T_{21}$ | $T_{22}$ | $T_{23}$ | $T_{24}$ | $T_{25}$ | $T_{26}$ | $T_{27}$ | $T_{28}$ | $T_{29}$ | $T_{30}$ | $T_{31}$ | $T_{32}$ |
|---|---|---|---|---|---|---|---|---|---|---|---|---|---|---|---|---|---|---|---|---|---|---|---|---|---|---|---|---|---|---|---|---|
| $A_1$ | $8_8$ | $1_1$ | $1_2$ | $1_4$ | $1_8$ | $2_1$ | $2_2$ | $2_4$ | $2_8$ | $3_1$ | $3_2$ | $3_4$ | $3_8$ | $4_1$ | $4_2$ | $4_4$ | $4_8$ | $5_1$ | $5_2$ | $5_4$ | $5_8$ | $6_1$ | $6_2$ | $6_4$ | $6_8$ | $7_1$ | $7_2$ | $7_4$ | $7_8$ | $8_1$ | $8_2$ | $8_4$ |
| $A_2$ | $8_4$ | $8_8$ | $1_1$ | $1_2$ | $1_4$ | $1_8$ | $2_1$ | $2_2$ | $2_4$ | | | | | | | | | | | | | | | | | | | | $7_4$ | $7_8$ | $8_1$ | $8_2$ |
| $A_3$ | $8_2$ | $8_4$ | $8_8$ | $1_1$ | $1_2$ | $1_4$ | $1_8$ | $2_1$ | $2_2$ | $2_4$ | | | | | | | | | | | | | | | | | | | | $7_4$ | $7_8$ | $8_1$ |
| $A_4$ | $8_1$ | $8_2$ | $8_4$ | $8_8$ | $1_1$ | $1_2$ | $1_4$ | $1_8$ | $2_1$ | $2_2$ | | | | | | | | | | | | | | | | | | | $7_1$ | $7_2$ | $7_4$ | $7_8$ |
| $A_5$ | $7_8$ | $8_1$ | $8_2$ | $8_4$ | $8_8$ | $1_1$ | $1_2$ | $1_4$ | $1_8$ | $2_1$ | | | | | | | | | | | | | | | | | | | $6_8$ | $7_1$ | $7_2$ | $7_4$ |
| $A_6$ | $7_4$ | $7_8$ | $8_1$ | $8_2$ | $8_4$ | $8_8$ | $1_1$ | $1_2$ | | | | | | | | | | | | | | | | | | | | | | $6_8$ | $7_1$ | $7_2$ |
| $A_7$ | $7_2$ | $7_4$ | $7_8$ | $8_1$ | $8_2$ | $8_4$ | $8_8$ | $1_1$ | $1_2$ | | | | | | | | | | | | | | | | | | | | | $6_4$ | $6_8$ | $7_1$ |
| | $7_1$ | $7_2$ | $7_4$ | $7_8$ | $8_1$ | $8_2$ | $8_4$ | $8_8$ | $1_1$ | | | | | | | | | | | | | | | | | | | | $6_1$ | $6_2$ | $6_4$ | $6_8$ |
| | $6_8$ | $7_1$ | $7_2$ | $7_4$ | $7_8$ | $8_1$ | $8_2$ | $8_4$ | | | | | | | | | | | | | | | | | | | | | $5_8$ | $6_1$ | $6_2$ | $6_4$ |
| | $6_4$ | $6_8$ | $7_1$ | $7_2$ | $7_4$ | $7_8$ | $8_1$ | | | | | | | | | | | | | | | | | | | | | | | $5_8$ | $6_1$ | $6_2$ |
| | $6_2$ | $6_4$ | $6_8$ | $7_1$ | $7_2$ | $7_4$ | $7_8$ | $8_1$ | | | | | | | | | | | | | | | | | | | | | | $5_4$ | $5_8$ | $6_1$ |
| | $6_1$ | $6_2$ | $6_4$ | $6_8$ | $7_1$ | $7_2$ | $7_4$ | $7_8$ | | | | | | | | | | | | | | | | | | | | | $5_1$ | $5_2$ | $5_4$ | $5_8$ |
| | $5_8$ | $6_1$ | $6_2$ | $6_4$ | $6_8$ | $7_1$ | | | | | | | | | | | | | | | | | | | | | | | $4_8$ | $5_1$ | $5_2$ | $5_4$ |
| | $5_4$ | $5_8$ | $6_1$ | $6_2$ | $6_4$ | $6_8$ | $7_1$ | | | | | | | | | | | | | | | | | | | | | | $4_4$ | $4_8$ | $5_1$ | $5_2$ |
| | $5_2$ | $5_4$ | $5_8$ | $6_1$ | $6_2$ | | | | | | | | | | | | | | | | | | | | | | | | | $4_4$ | $4_8$ | $5_1$ |
| | $5_1$ | $5_2$ | $5_4$ | $5_8$ | $6_1$ | $6_2$ | | | | | | | | | | | | | | | | | | | | | | $3_8$ | $4_1$ | $4_2$ | $4_4$ | $4_8$ |
| | $4_8$ | $5_1$ | $5_2$ | $5_4$ | $5_8$ | $6_1$ | | | | | | | | | | | | | | | | | | | | | | | $3_8$ | $4_1$ | $4_2$ | $4_4$ |
| | $4_4$ | $4_8$ | $5_1$ | $5_2$ | $5_4$ | | | | | | | | | | | | | | | | | | | | | | | | $3_4$ | $3_8$ | $4_1$ | $4_2$ |
| | $4_2$ | $4_4$ | $4_8$ | $5_1$ | | | | | | | | | | | | | | | | | | | | | | | | | | $3_4$ | $3_8$ | $4_1$ |
| | $4_1$ | $4_2$ | $4_4$ | $4_8$ | $5_1$ | | | | | | | | | | | | | | | | | | | | | | | | | $3_2$ | $3_4$ | $3_8$ |
| | $3_8$ | $4_1$ | $4_2$ | | | | | | | | | | | | | | | | | | | | | | | | | | $2_8$ | $3_1$ | $3_2$ | $3_4$ |
| | $3_4$ | $3_8$ | $4_1$ | | | | | | | | | | | | | | | | | | | | | | | | | | $2_4$ | $2_8$ | $3_1$ | $3_2$ |
| | $3_2$ | $3_4$ | $3_8$ | $4_1$ | | | | | | | | | | | | | | | | | | | | | | | | | | $2_4$ | $2_8$ | $3_1$ |
| | $3_1$ | $3_2$ | $3_4$ | $3_8$ | $4_1$ | | | | | | | | | | | | | | | | | | | | | | | | | $2_2$ | $2_4$ | $2_8$ |
| | $2_8$ | $3_1$ | $3_2$ | | | | | | | | | | | | | | | | | | | | | | | | | | $1_8$ | $2_1$ | $2_2$ | $2_4$ |
| | $2_4$ | $2_8$ | $3_1$ | $3_2$ | | | | | | | | | | | | | | | | | | | | | | | | | | $1_8$ | $2_1$ | $2_2$ |
| | $2_2$ | $2_4$ | $2_8$ | $3_1$ | | | | | | | | | | | | | | | | | | | | | | | | | | $1_4$ | $1_8$ | $2_1$ |
| $A_{28}$ | $2_1$ | $2_2$ | $2_4$ | $2_8$ | $3_1$ | | | | | | | | | | | | | | | | | | | | | | | | | $1_2$ | $1_4$ | $1_8$ |
| $A_{29}$ | $1_8$ | $2_1$ | $2_2$ | $2_4$ | | | | | | | | | | | | | | | | | | | | | | | | | $8_8$ | $1_1$ | $1_2$ | $1_4$ |
| $A_{30}$ | $1_4$ | $1_8$ | $2_1$ | $2_2$ | | | | | | | | | | | | | | | | | | | | | | | | | | $8_8$ | $1_1$ | $1_2$ |
| $A_{31}$ | $1_2$ | $1_4$ | $1_8$ | $2_1$ | $2_2$ | | | | | | | | | | | | | | | | | | | | | | | | | $8_4$ | $8_8$ | $1_1$ |
| $A_{32}$ | $1_1$ | $1_2$ | $1_4$ | $1_8$ | $2_1$ | $2_2$ | $2_4$ | $2_8$ | $3_1$ | $3_2$ | $3_4$ | $3_8$ | $4_1$ | $4_2$ | $4_4$ | $4_8$ | $5_1$ | $5_2$ | $5_4$ | $5_8$ | $6_1$ | $6_2$ | $6_4$ | $6_8$ | $7_1$ | $7_2$ | $7_4$ | $7_8$ | $8_1$ | $8_2$ | $8_4$ | $8_8$ |

FIG. 1B CONTENTS TABLE OF MAIN REGISTER

| | $T_1$ $T_2$ $T_3$ $T_4$ | $T_5$ $T_6$ $T_7$ $T_8$ | $T_9$ $T_{10}$ $T_{11}$ $T_{12}$ | $T_{13}$ $T_{14}$ $T_{15}$ $T_{16}$ | $T_{17}$ $T_{18}$ $T_{19}$ $T_{20}$ | $T_{21}$ $T_{22}$ $T_{23}$ $T_{24}$ | $T_{25}$ $T_{26}$ $T_{27}$ $T_{28}$ | $T_{29}$ $T_{30}$ $T_{31}$ $T_{32}$ |
|---|---|---|---|---|---|---|---|---|
| $B_1$ | 8 | 1 | 2 | 3 | 4 | 5 | 6 | 7 |
| $B_2$ | 7 | 8 | 1 | 2 | 3 | 4 | 5 | 6 |
| $B_3$ | 6 | 7 | 8 | 1 | 2 | 3 | 4 | 5 |
| $B_4$ | 5 | 6 | 7 | 8 | 1 | 2 | 3 | 4 |
| $B_5$ | 4 | 5 | 6 | 7 | 8 | 1 | 2 | 3 |
| $B_6$ | 3 | 4 | 5 | 6 | 7 | 8 | 1 | 2 |
| $B_7$ | 2 | 3 | 4 | 5 | 6 | 7 | 8 | 1 |
| $B_8$ | 1 | 2 | 3 | 4 | 5 | 6 | 7 | 8 |

FIG. 1C CONTENTS TABLE OF AUXILIARY REGISTER

TIME CHART, EXAMPLE "00000800"

TIME CHART, EXAMPLE "00000800"

TIME CHART, EXAMPLE "00000800"

TIME CHART, EXAMPLE "00000800"

TIME CHART, EXAMPLE "00000800"

TIME CHART, EXAMPLE "00003751"

TIME CHART, EXAMPLE "00003751"

TIME CHART, EXAMPLE "00003751"

INVENTOR
KIYOYUKI TADA

BY Brufsky, Staas, Breiner & Halsey
ATTORNEYS

INVENTOR
KIYOYUKI TADA

BY Brufsky, Staas, Breiner & Halsey
ATTORNEYS

INFORMATION OUTPUT SYSTEM

BACKGROUND OF THE INVENTION

1. Field of the Invention

This invention relates to an information output system and more specifically to a system suitable for use in providing a visual indication of the numerical information.

2. Description of Prior Art

Information is typically processed today in electronic processing machines, from which the resultant information is then taken for some desired subsequent purpose. The resultant information is sometimes converted ultimately to a visual indication for observation by an operator. Devices for such visual indication may be of various types, such as indicating tubes, cathode ray tubes, sheets of paper on which information is printed by means of a printer, etc.

For the purpose of indication of information containing a plurality of units, an indicator having a predetermined plurality of elements or portions is provided, and the information is indicated by means of all or less than all of these elements or portions. In the event that the information to be indicated is of numerical form, a predetermined plurality of such indicator elements or portions, each constituting a digit, are provided. In general, an excess of indicator elements or portions is provided, to allow an indicating capacity which is greater than the number of digits normally foreseen to require indication in a given decimal number. Hence, the numerical information is indicated frequently by using less than the total number of such elements or portions. In those instances, the remaining elements or portions of more significant position than the digit of greatest significance in the number being indicated are caused to indicate "zero."

Indication of the zeroes in these remaining more significant digit positions, however, makes it more difficult to distinguish the desired indicated numerical information than would be the case if these surplus zeroes were blanked out. Assuming that the numerical information is represented by Arabic numerals, the problem is especially aggravated in the case of numerals similar in shape to "0," e.g., numerals "6" and "9," located in the most significant digit position of the numerical information. Another problem is that indication of each undesired zero causes wasteful power consumption, which is extremely undesirable in portable battery-operated electronic machines, such as desk top electronic calculators.

Many devices have been proposed with a view to suppressing or preventing the indication of the undesired zero in more significant digits. However, the devices of the prior art are complicated and expensive, mainly because they have required complicated logic circuits connected to every information storing element for detecting an undesired zero therein.

Thus it is advantageous to simplify the information output system wherein the undesired information is suppressed. The present invention achieves that purpose.

SUMMARY OF THE INVENTION

Briefly stated, the invention comprises logic means connected between a main circulation shift register and an auxiliary circulation shift register. First information registered in the main register is circulated as a function of predetermined timing pulses. In synchronism with the circulation in the main register, circulation is also effected in the auxiliary register. During repetition of the circulation, second information representative of discrimination between desired and undesired information portions in the first information is generated in the auxiliary shift register by means of the logic means.

The second information is utilized to prevent the undesired information portion in the first information from being utilized or indicated. The logic means comprises relatively few logic gates and connections between the specified portions of the main register and auxiliary register respectively. Assuming that the first information is a given decimal number, undesired zeroes in the more significant digits thereof are prevented from being indicated by the indicating means under the control of the second information.

In a preferred embodiment of the invention wherein the decimal number is processed, a main shift register constituted of a plurality of storing elements, or stages, for retaining digits each having four bits, for example, is constructed and arranged to permit the registered decimal number to be shifted and circulated as a function of the predetermined timing pulses. Apart from the main shift register is provided an auxiliary shift register having the same number of bit positions as the number of digit positions in the main shift register. An indicating means is connected to the main register so as to produce an indication of the registered decimal number.

Between both registers is provided a first logic means for detecting the presence of any digit of the registered decimal number other than zero in a preselected set of four consecutive bit positions, and for writing resultant information into a bit position in the auxiliary shift register to ultimately designate the position of the digit in the corresponding position in the main register. A second logic means associated with the auxiliary shift register provides a modified form of recirculation of the logic "1" bits written into that shift register for establishing a logical bit pattern in the auxiliary shift register which identifies the positions of non-zero digits in the number to be displayed. Specifically, in one embodiment of the invention, the auxiliary register includes a number of stages equal to the number of stages of the main register. Whereas the main register includes a plurality of storage elements in each stage, however, the auxiliary register includes only one storage element for each stage thereof. Considering the input stage of the auxiliary register as the most significant stage and the last or output stage as the least significant stage, the second logic means is connected to receive the output of the next-to-last stage — i.e. the stage next to the least significant stage — of the auxiliary register. The output of the second logic means is connected to the input of the first stage — i.e. the most significant stage — of the auxiliary register. The data in the stages of the auxiliary register is advanced to the respectively next successive stages simultaneously and recirculated through the recirculation path (including the second logic means) in synchronism with the shift of data through the successive stages of the main register. Recirculation of the data in the recirculation path of the auxiliary register, however, is inhibited by the second logic means in response to an inhibit input generated during the interval in which the data is recirculated from the least significant storing element of the main register, for each complete recirculation of data in that main register.

The recirculation function in the auxiliary register as afforded by the described recirculation loop under control of the second logic means provides for writing a logic "1" bit into the input or first stage of the auxiliary register at the time that the logic "1" bit previously written therein and currently stored in the stage next to the least significant stage is shifted to that least significant stage. As a result, the rewritten logic "1" bit is written into a bit position of the pattern developed in the auxiliary register which is one bit position less significant than the bit position of the previously written logic bit from which it is derived. In accordance with this arrangement and for successive recirculations of the data in the auxiliary register, there is developed the desired logic bit pattern of a logic "1" bit in each stage of the auxiliary register corresponding to each stage of the main register wherein is stored numerical information identifying digits of the number to be displayed.

In other embodiments of the invention, a similar recirculation technique provides for developing the desired logic bit pattern in the auxiliary register.

During the repetition of the circulation a bit pattern representative of the digit positions of the main shift register wherein the registered decimal number exists is generated in the auxiliary register. The bit pattern is applied to the indicating means so as to prevent the undesired "zero" in each more significant digit from being indicated. By using a simple additional counter the system is also applicable to the indication of the decimals.

Therefore, it is an object of the invention to provide an improved information output system.

It is another object of the invention to simplify the scheme for detecting the desired and undesired information portions of given information.

A further object of the invention is to detect the undesired zero in the more significant digits of given numerical information by circulating the information in registers.

Still a further object of the invention is to detect the undesired zero in the more significant digits of given numerical information with simplified means.

It is a further object of the invention to reduce the number of the required logic gates and connections in such system.

It is still a further object of the invention to provide such an output system suitable for implementation in an integrated circuit or a large scale integration.

It is a further object of the invention to provide a system which affords in a simple manner the indication of the decimal point in numerical information.

These objects and other objects and features of the invention will be apparent and more fully understood from the following description of the invention made with reference to the accompanying drawings.

BRIEF DESCRIPTION OF THE DRAWINGS

FIGS. 1B and 1C are tables representing the contents of the main register and an auxiliary register employed in the system, respectively.

Figure 1:
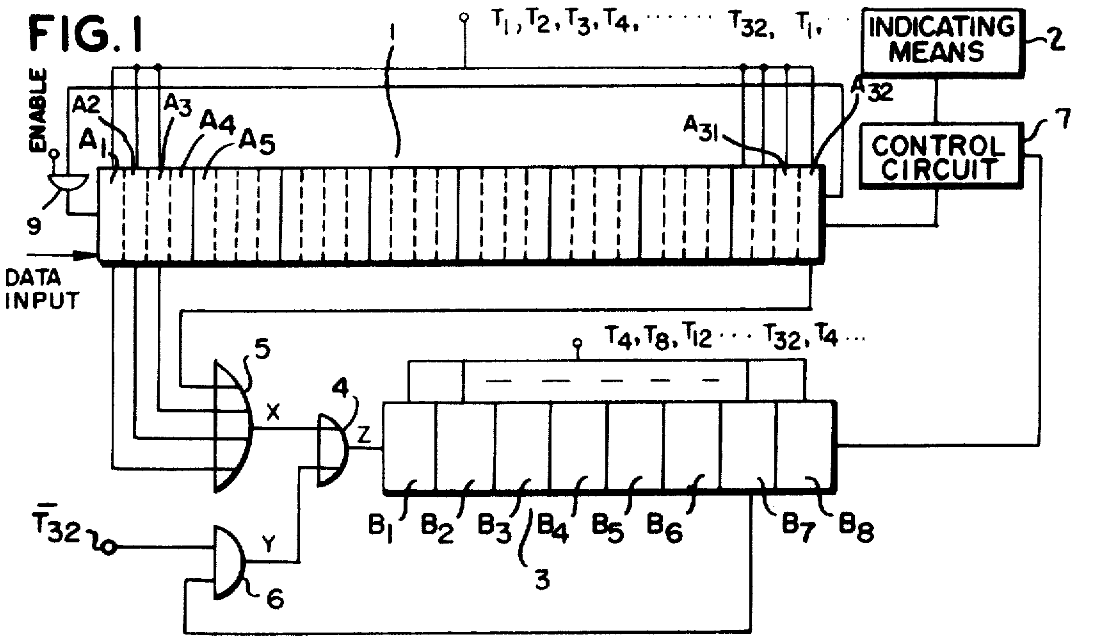
FIG. 1 shows block diagram of a system in accordance with the invention.

DESCRIPTION OF THE PREFERRED EMBODIMENTS:

Embodiment of FIG. 1

Referring to FIG. 1, a main shift register 1 having a capacity of eight digits each having four bits is so provided that the total 32 bits are arranged in series, these bits being denoted from the most significant bit in turn as $A_1$, $A_2$, $A_3$, . . . up to the least significant bit as $A_{32}$. The least significant bit $A_{32}$ is connected to the most significant bit $A_1$ for the purpose of circulation of the information in the register 1.

An indicating means 2 is connected through a control circuit 7 to the main shift register 1 so as to be energized in accordance with the contents of the register 1 and to indicate a number registered in the main register 1. Such indicating means that is energized in accordance with the information registered in the circulation shift register is well known to those skilled in the art. The register 1 is operated as a function of timing pulses $T_1$, $T_2$, $T_3$, . . . $T_{32}$ as a clock pulse. The numerical information in the BCD format identifying digits to be displayed is entered into the main register 1 as illustratively indicated by the input labeled DATA INPUT. AND gate 9 is connected in the recirculating loop of main register 1 to be enabled by an ENABLE input to permit recirculation of data therein.

Apart from the main register 1 is provided an auxiliary shift register 3 having a capacity of eight bits, i.e., the number of bits in the auxiliary register being the same as the number of digits which can be stored in the main register 1 in this embodiment, each bit being denoted as $B_1$, $B_2$, $B_3$, . . . $B_8$. The auxiliary shift register 3 is operated as a function of every forth timing pulse $T_4$, $T_8$, $T_{12}$, $T_{16}$, $T_{20}$, $T_{24}$, $T_{28}$ and $T_{32}$ as a clock pulse. More specifically, shifting of data in the stages of the auxiliary register 3 is performed at the end of every fourth timing pulse $T_4$, $T_{12}$ . . . $T_{32}$, as discussed in detail hereafter. An input to the most significant bit position $B_1$ of the auxiliary shift register 3 is derived as an output of a first OR gate 4, the inputs of which are obtained from the output of a second OR gate 5 and an output of an AND gate 6. The input paths of the second OR gate 5 are connected to the elements containing the most significant bit $A_1$, the two subsequent bits $A_2$ and $A_3$ and the least significant bit $A_{32}$ of the main shift register 1.

The logic state of the bit $B_7$ next to the least significant bit $B_8$ of the auxiliary shift register 3 and a pulse $\bar{T}_{32}$ which is a complement of the timing pulse $T_{32}$ out of the said eight pulses $T_4$, $T_8$, . . . $T_{32}$ which serve as a clock pulse for the register 3 are applied to the AND gate 6 as an input. The auxiliary shift register 3 is connected through the control circuit 7 to the indicating means 2 so that the means 2 may be controlled in accordance with the contents of the auxiliary shift register 3.

The timing pulses designated by the term "$T_n$" wherein $n$ = 1, 2, . . . 32 and the corresponding control functions are now considered in more detail. Although various timing controls may be employed for advancing data through the recirculating shift registers 1 and 3 as in FIG. 1, in a preferred embodiment of the invention, a two-phase clocking function is employed. A reference text of general interest relating to clocking configurations and shift registers, both as to construction and operation, is *Digital Computer Design Fundamentals* by Yaohan Chu, McGraw-Hill Book Company, copyright 1962, and particularly sections 5-12 entitled "Clocking Configuration" and 5-13 entitled "Other Digital Circuits" and Chapter 10, "-Digital Computer Design Fundamentals", especially section 10-3, "Shift Registers". In the latter, pg. 370, is presented a logic diagram of a shift register stage using a temporary register wherein plural clocking or control signals are required for the shifting of information from a given to a successive stage. A further prior art teaching of shift registers and clocking functions is afforded in *Pulse, Digital, and Switching Wave Forms*, by Jacob Millman and Herbert Taub, McGraw-Hill Book Company, copyright 1965 with particular reference to section 9-13 "Registers", at pg. 343, pg. 345 "A Shift Register" and section 9-14, pgs. 347-349 "Dynamic Shift Registers" wherein the data is recirculated as a function of a clock pulse train, gating logic being provided to control the recirculation of the data or the introduction of the new data into the dynamic register. Additional examples of recirculating shift registers and clocking functions are provided in U.S. Pat. Nos. 3,308,286, 3,267,258, and 3,329,257. In fact, shift registers adaptable for construction in large scale integrated form as are desirable for use in the present system may be found in U.S. Pat. Nos. 3,461,312, 3,431,433, IBM Technical Disclosure Bulletin of Karlsbakk, Volume 7, No. 1, June 1964. Additional teachings of interest are found in U.S. Pat. Nos. 3,452,009, and 3,267,295.

Figure 1A:
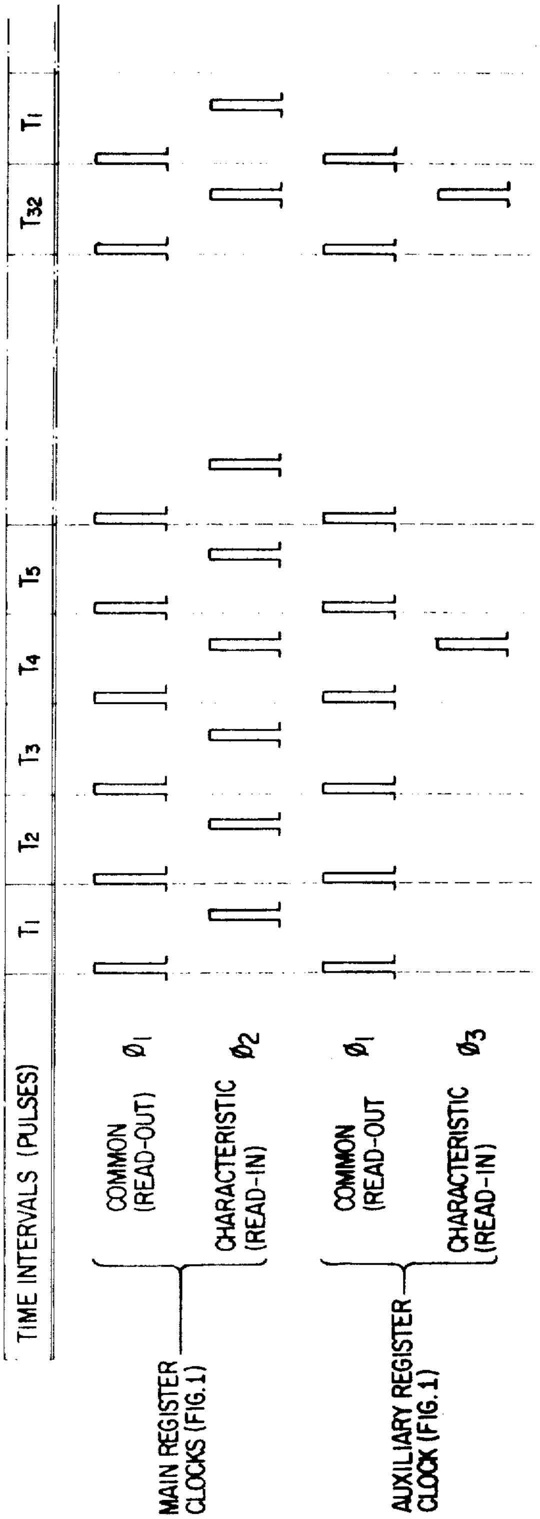
FIG. 1A comprises a timing chart representing clocking pulses utilized for controlling the recirculating shift registers of the type disclosed herein.
Figure 1D:
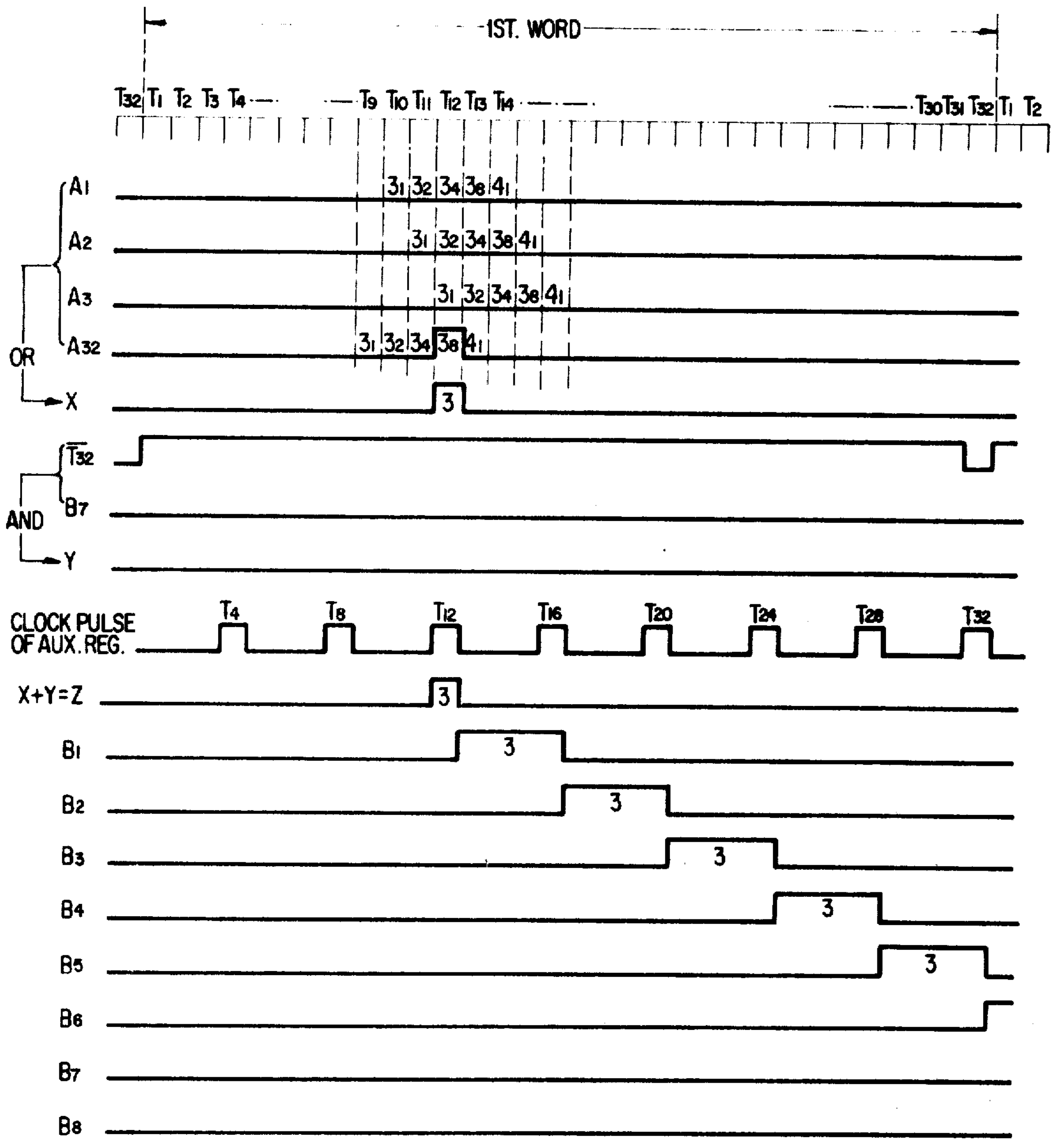
FIGS. 1D through 1K comprise timing charts representing the contents of the registers corresponding to specific examples of operation of the system of the invention as set forth in the detailed description of the invention.

In FIG. 1A is provided a timing chart illustrating the clocking pulses supplied to the main and auxiliary registers for accomplishing the advancing of the data in a recirculating cycle therethrough. It is to be understood that any suitable clocking technique may be employed and the following is merely illustrative of one such technique. Specifically, the main register employs two-phase clocking as illustrated by the waveforms $\phi_1$ and $\phi_2$. The $\phi_1$ clock pulses, at their leading or rising edges, define the beginning of the time intervals $T_1$, $T_2$, . . . $T_{32}$ and the $\phi_2$ clocking pulses occur midway of each of these time intervals. In the auxiliary register, two-phase clocking is again employed, including an identical clock $\phi_1$ and a third clock $\phi_3$ which occurs simultaneously with the clock $\phi_2$ for each of the fourth timing intervals $T_4$, $T_8$, . . . $T_{32}$.

The $\phi_1$ clock is the common clock for the two registers and is termed the read-out clock. Its function is to set the output of each stage to the logic state of the input to that stage. The $\phi_2$ and $\phi_3$ clocks are the characteristic clocks for the registers 1 and 3, respectively, and are termed the read-in clocks. Their function is to read in the logical state output of a given stage, e. g. $A_{21}$, (and which, of course, is the input signal to the next stage) into the succeeding stage, e.g. $A_{22}$.

Thus, as to the main register, in the successive time intervals $T_1, T_2, \ldots T_{32}, T_1 \ldots$, the $\phi_1$ clock sets the output of each stage to the logic input of that stage. For example, the logic "1" in storage element $A_{21}$ is provided as the output for the interval $T_1$ and by $\phi_2$ is made input to storage element $A_{22}$. $\phi_1$ of interval $T_2$ then sets the output of element $A_{22}$ to that logic "1" value, as shifted thereto from $A_{21}$. The simultaneous application of these two alternative clocks to all stages accordingly causes the data from each stage to be shifted to the next successive stage, simultaneously for all stages.

As to the auxiliary register, clock $\phi_1$ performs the read-out function as in the case of the main register, such as in the time interval $T_1$. Since no read-in clock ($\phi_3$) occurs during the intervals $T_1$, $T_2$ and $T_3$, the clocks $\phi_1$ occurring in those intervals serve to maintain the data stored in the stages of the auxiliary register (i.e., as read in by the last occurring $\phi_3$ clock which, in this specific example, occurred during the preceding $T_{32}$ interval) and thus the data as established in the stages thereof is retained for the period $T_1$ through $T_4$. Upon the occurrence of clock $\phi_3$ (and thus in intervals $T_4, T_8 \ldots$ etc.), the data in each stage is read into the succeeding stage. The following read-out clock $\phi_1$ (occurring therefore at the beginning of the next time interval, i.e. $T_5, T_9, \ldots$ etc.), then sets the output of the next stage to the logic input value as read in by the preceding $\phi_3$ clock. Thus, for example, a logic "1" stored in stage $B_1$ at time $T_1$ is retained therein through time $T_4$. During $T_4$, $\phi_3$ reads that logic "1" as an input to the next stage, $B_2$. The next read-out $\phi_1$ clock, defining the beginning of $T_5$, then sets the output of stage $B_2$ to the logic "1" value. Hence, as above discussed, shifting occurs in the auxiliary register only as a function of every fourth timing pulse, or time interval, of the main register. This also is illustrated in FIG. 1A for the time interval $T_{32}$. It will be recalled, however, that $T_{32}$ disables the recirculation from $B_7$ to $B_1$. Nevertheless, the shift function does occur and the state of the final stage $B_8$ is controlled correspondingly to provide an output to the control circuit 7 and then is cleared.

In the following discussion, therefore, and for convenience of presentation, the advancing of the logic "1" and logic "0" bits through the stages of the main register 1 are characterized as occurring in conjunction with the time intervals $T_1$ through $T_{32}$, it being understood, of course, that the shifting functions are performed in a conventional manner as illustratively set forth in FIG. 1A and the corresponding discussion. An example of two-phase clocking of a shift register is afforded in U.S. Pat. No. 3,571,808 as well as other references noted above.

Reference now is made to FIGS. 1B and 1C, respectively comprising contents tables of the main and auxiliary registers. The stages $A_1$ through $A_{32}$ and $B_1$ through $B_8$ are shown in the left-hand vertical column and the timing pulses $T_1$ through $T_{32}$ are shown in the top horizontal row as to the main register table of FIG. 1B and in groups of four in the top horizontal row as to the auxiliary register table of FIG. 1C. Herein, the convention is adopted of identifying the eight digit positions of the display by the numerals 1 through 8 for the least significant, through the most significant digits, respectively. In FIG. 1B, the further convention is adopted of identifying by the subscripts 1, 2, 4 and 8, the BCD bit bit decimal values of the four bit BCD code employed. As discussed hereafter in specific examples, all BCD bit positions for a given digit have a bit value of "0" if the digit is 0 (i.e., zero) and one or more thereof have the bit value of "1" if the digit is other than zero. Tracing through the contents table of FIG. 1B, it will be apparent that at time $T_1$, the information for the most significant digit position, i.e. the eighth digit position, is stored in accordance with its four BCD bit values in the four bit positions $A_1$ through $A_4$, and so forth through the least significant digit position, i.e. the first digit position, the information (i.e. the four BCD bit values) for which is stored in the four bit positions $A_{29}$ through $A_{32}$. These BCD bit values advance through the 32 bit storage positions $A_1$ to $A_{32}$ of the main register under control of the successive timing pulses, as identified for convenience by $T_1$ through $T_{32}$, and recirculate.

The contents table of FIG. 1C for the auxiliary register presents the identical recirculation type function. In this instance, however, any digit position in the numeral to be displayed which comprises a zero, and accordingly is stored and represented in the main register by binary bit values of "0", results in a "0" bit in the corresponding stage of the auxiliary register. Conversely, any such digit position which is other than zero results in a "1" bit in the corresponding stage of the auxiliary register. In a manner to be described in the specific examples which follow, the values of the auxiliary register are modified during successive recirculations thereof to establish a bit pattern of "1"'s in all digit positions from the least significant up to the most significant digit position of the number to be displayed, and all "0" bit values in the more significant digit positions. It must be recognized, however, that these bit values as stored in the main register in accordance with the numeral to be displayed, and as developed in the logic circuits in conjunction with the storage in the auxiliary register, are continuously recirculating in synchronized relationship as above set forth. The indicating means is as well synchronized with that recirculating information to produce the appropriate display of the numeral with the undesired zeros being suppressed.

Some examples of the operation of the FIG. 1 system will now be described in detail.

Let it be assumed that a decimal number "00000800" has been introduced to the main shift register 1. Further let it be assumed that the decimal number is registered in accordance with the binary decimal code. The number and the code are utilized in the present example only for simplicity of explanation of the operation and therefore should not be construed by way of limitation. The logical state of every bit of a few less significant digits of the main shift register 1 is shown in the Table I.

TABLE I

| Bit of main register | $A_{18}$ | $A_{19}$ | $A_{20}$ | $A_{21}$ | $A_{22}$ | $A_{23}$ | $A_{24}$ | $A_{25}$ | $A_{26}$ | $A_{27}$ | $A_{28}$ | $A_{29}$ | $A_{30}$ | $A_{31}$ | $A_{32}$ |
|---|---|---|---|---|---|---|---|---|---|---|---|---|---|---|---|
| Logical state | 0 | 0 | 0 | 1 | 0 | 0 | 0 | 0 | 0 | 0 | 0 | 0 | 0 | 0 | 0 |

As seen from the Table, only the bit $A_{21}$ shows the logic "1," while the remaining are all the logic "0." On the other hand, the auxiliary shift register 3 has been reset and the logic "0" has been stored in all bits.

In the following discussion, it is assumed that the logic "1" bit was stored in a bit storage position $A_{21}$ in establishing the initial storage condition and thus is present therein for the time interval $T_1$. At the time of pulse $T_2$ the logic "1" in the bit $A_{21}$ has been transferred to the bit $A_{22}$, resulting in the logic "0" in the bit $A_{21}$. Likewise, at the time of pulse $T_3$ the logic "1" has been transferred from bit $A_{22}$ to bit $A_{23}$ and at the end of pulse $T_4$ from bit $A_{23}$ to $A_{24}$. At the same time i.e. at the end of $T_4$, a transfer or shift of any logic "1" stored in any stage of the auxiliary register would have been made in the auxiliary shift register 3. But since there is no logic "1" in any bit of the auxiliary shift register 3, as described above, there is still stored the logic "0" in all bits of the register 3.

The transfer or rightward shift in the main shift register 1 is continued and at the time of timing pulse $T_{12}$, the logic 1 previously stored in the stage $A_{21}$ at the time of pulse $T_1$ has been transferred to the bit $A_{32}$, as shown in the Table II.

TABLE II

| Bit of main register | $A_{18}$ | $A_{19}$ | $A_{20}$ | $A_{21}$ | $A_{22}$ | $A_{23}$ | $A_{24}$ | $A_{25}$ | $A_{26}$ | $A_{27}$ | $A_{28}$ | $A_{29}$ | $A_{30}$ | $A_{31}$ | $A_{32}$ |
|---|---|---|---|---|---|---|---|---|---|---|---|---|---|---|---|
| Logical state | 0 | 0 | 0 | 0 | 0 | 0 | 0 | 0 | 0 | 0 | 0 | 0 | 0 | 0 | 1 |

At the time of timing pulse $T_{12}$, the logic "1" from stage $A_{32}$ is applied to the most significant bit $B_1$ of the auxiliary shift register 3 through the second OR gate 5 and the first OR gate 4 and in accordance with the clocking function of timing pulse $T_{12}$, as to auxiliary register 3, has been written into the stage $B_1$ at the time of timing pulse $T_{13}$. In this instance, it should be noted that the auxiliary shift register 3 is operated as a function of every fourth timing pulse, i.e., $T_4$, $T_8$, $T_{12}$, $T_{16}$, $T_2$, $T_{24}$, $T_{28}$ and $T_{32}$, of the pulses $T_1$ through $T_{32}$ as a clock pulse and, for example, the characteristic code $\phi_3$. The logic "1" written in the most significant bit $B_1$ remains untransferred in the bit $B_1$ during the period of timing pulses $T_{13}$ through $T_{16}$ and is transferred at the end of $T_{16}$ to the next bit $B_2$ at which it is stored for the duration of $T_{17}$, $T_{18}$, $T_{19}$ and $T_{20}$. Likewise, the logic "1" remains in the bit $B_3$ during the period of pulses $T_{21}$ through $T_{24}$, in the bit $B_4$ during the period of pulses $T_{25}$ through $T_{28}$, in the bit $B_5$ during the period of pulses $T_{29}$ through $T_{32}$, in the bit $B_6$ during the period of timing pulses $T_1$ through $T_4$ of the second repetition cycle and in the bit $B_7$ during the period of pulses $T_5$ through $T_8$ of the second repetition cycle. Simultaneously, the transfer or rightward shift is made in the main shift register 1 as a function of every timing pulse and the logic "1" comes to the bit $A_{20}$ at the time of pulses $T_{32}$ and returns to the original bit $A_{21}$ at the time of pulse $T_1$ of the second repetition cycle. Thus it is seen that the above mentioned logic "1" written in the auxiliary shift register 3 is representative of the presence of at least one logic "1" in the sixth digit or the bits $A_{21}$ through $A_{24}$ of the main shift register 1 at the time of timing pulse $T_1$.

During the period of timing pulses $T_5$ through $T_8$ of the second repetition cycle, the logic "1" remaining in the bit $B_7$ of the auxiliary register 3 is applied to an input of the AND gate 6, another input of which is the pulse $\overline{T_{32}}$, the complement of pulse $T_{32}$, as is described above. Application of the pulse $\overline{T_{32}}$ (i.e., NOT $T_{32}$) to AND gate 6 during the occurrence of timing pulses $T_5$ through $T_8$ of the second repetition cycle satisfies the input condition of the gate 6 (since both of its inputs are logic "1"'s resulting in an output of the logic "1". The logic "1" from the gate 6 is fed to the most significant bit $B_1$ of the auxiliary shift register 3 through the first OR gate 4. As discussed above, however, the logic "1" is not written into the bit $B_1$ during the period of timing pulses $T_5$ through $T_8$ of the second repetition cycle but rather is written for the first time into the bit $B_1$ at the end of pulse $T_8$ and thus it is present therein at the time of the pulse $T_9$ of the second repetition cycle. At the same time the logic "1" in the bit $B_7$ is shifted rightward to the bit $B_8$. Thus, the bit pattern of the auxiliary shift register 3 during the period of pulses $T_9$ through $T_{12}$ is "10000001." It should be noted that the logic bit "1" now present in stage $B_1$ was derived from the logic "1" bit previously stored in stage $B_7$ and hence, with regard to the recirculation of data in the auxiliary register, it is now displaced to a bit position which is one bit less significant than the position in which the logic "1" was originally written into the auxiliary register from the main register.

At the time of pulse $T_{12}$ of the second repetition cycle the logic "1" has reached the least significant bit $A_{32}$ of the main register 1. The said logic "1" is, therefore, ready to be written into the most significant bit $B_1$ of the auxiliary shift register 3 through both OR gates 5 and 4. Consequently, the said logic "1" is written into the bit $B_1$ as of the timing signal $T_{13}$ of the second repetition cycle, resulting in a bit pattern "11000000" of the auxiliary shift register 3. This bit pattern is kept unchanged from $T_{13}$ up to the end of the timing pulse $T_{16}$. Likewise, the bit pattern during the period of pulses $T_{17}$ through $T_{20}$ is "01100000," during the period of pulses $T_{21}$ through $T_{24}$ "00110000," during the period of pulses $T_{25}$ through $T_{28}$ "0001100," during the period of pulses $T_{29}$ through $T_{32}$ "00001100" and during the period of timing pulses $T_1$ through $T_4$ of the third repetition cycle "00000110," respectively. The logic "1" which remains in the bit $B_7$ during the period of pulses $T_1$ through $T_4$ of the third repetition cycle is applied to one input of the AND gate 6, the other input of which is the pulse $\overline{T_{32}}$, the complement of the pulse $T_{32}$, as described above. Therefore, an input condition of the gate 6 is met and the logic "1" output of the logic product of the gate 6 is rewritten into the bit $B_1$ as of the timing pulse $T_5$ of the third repetition cycle. It should be noted again that the new rewrite of logic "1" is for the bit position of the bit pattern recirculating in the auxiliary register which is one bit less significant than the bit wherein the immediately previously rewritten logic "1" was written.

During the period of timing pulses $T_5$ through $T_8$ the logic "1" in the bit $B_6$ is transferred to the bit $B_7$ and that of the bit $B_7$ to the bit $B_8$ accordingly. The bit pattern or the contents of the auxiliary shift register 3 during that time is "10000011." At the end of timing pulse $T_8$ the logic "1" in the bit $B_7$ written into $B_1$ through the AND gate 6. Thus during the period of pulses $T_9$ through $T_{12}$ of the third repetition cycle the bit pattern or the contents of the auxiliary shift register 3 is "11000001."Likewise, the bit pattern of the register 3 during the period of pulses $T_{13}$ through $T_{16}$ is "11100000," during the period of pulses $T_{17}$ through $T_{20}$ "01110000," during the period of pulses $T_{21}$ through $T_{24}$ "00111000," during the period of pulses $T_{25}$ through $T_{28}$ "00011100," and during the period of pulses $T_{29}$ through $T_{32}$ "00001110," respectively. Thus the third repetition cycle of the timing pulses $T_1$ through $T_{32}$ ends.

During the period of timing pulses $T_{29}$ through $T_{32}$ of the third repetition cycle, the logic "1" stored in the bit $B_7$ of the auxiliary shift register 3 is applied as one input to the AND gate 6, the other input of which is the pulse $\overline{T_{32}}$, the complement of the pulse $T_{32}$. However, at the time of pulse $T_{32}$, pulse $\overline{T_{32}}$ is a logic "0" since the latter pulse is, by definition, the inverse of the former. Thus, the input condition of the AND gate 6 is not met at the time of pulse T=, resulting in no application of the logic "1" to the bit $B_1$ of the auxiliary shift register 3 due to disabling of the AND gate 6. As described above, since it is as a function of only the timing pulse $T_{32}$ out of the pulses $T_{29}$ through $T_{32}$ that the auxiliary shift register 3 is operated and since at the time of pulse $T_{32}$ the AND gate 6 is disabled, the logic "1" in the bit $B_7$ is not rewritten into the bit $B_1$ at the end of $T_{32}$ and thus is not present in stage $B_1$ at the timing pulse $T_1$ of the fourth repetition cycle. Thus it is seen that the bit pattern or contents of the auxiliary shift register 3 during the period of pulses $T_1$ through $T_4$ of the fourth repetition cycle is "00000111"and that the pulse $\overline{T_{32}}$ serves to inhibit the rewrite of logic "1" from bit $B_7$ to bit $B_1$ at the end of timing pulse $T_{32}$.

During this period of pulses $T_1$ through $T_4$ the logic "1" in the bit $B_7$ is applied through the AND gate 6 to the bit $B_1$ and, at the end of $T_4$, is written therein. Therefore, the bit pattern of the auxiliary shift register 3 during the subsequent period of pulses $T_5$ through $T_8$ is "10000011." Thereafter, the bit pattern or contents of this type continues to be circulated in the auxiliary shift register 3 with the pattern kept unchanged unless the decimal number to be registered in the main shift register 1 is changed. The bit pattern of the auxiliary shift register 3 during the period of signals $T_1$ through $T_4$ has the logic "1" only in the three least significant bits. As is readily understood, the bit pattern during the said period can be utilized by means of the control circuit 7 to control the indicating means 2, so that only the contents of the digits in the main shift register 1 corresponding in position to the bits having the logic "1" state in the auxiliary register 3 may be indicated. As a result, it is possible to indicate the decimal number of only the desired digits, the three least significant digits in the above example, i.e., "800," while the remaining more significant digits are prevented from being indicated.

The foregoing operations, in accordance with developing a zero suppression bit pattern in the auxiliary register for the display of the number "0000800" may as well be understood with reference to the contents tables of FIGS. 1B and 1C furthermore considered in light of the timing charts of FIGS. 1D through 1H. In these timing charts one cycle time of $T_1$ through $T_{32}$, inclusive, is called a "word". The timing charts furthermore are related to FIG. 1 as to the specific main register stages $A_1$, $A_2$, $A_3$ and $A_{32}$ (the outputs of which are supplied to the OR gate 5) and the stages $B_1$ through $B_8$ of the auxiliary register. The output of OR gate 5 furthermore is identified as the signal X in FIG. 1, the output of AND gate 6 of FIG. 1 by the letter Y and the logic function of OR gate 4 by the letter Z as to the signals X and Y. Furthermore, the clock pulses for the auxiliary register are indicated again utilizing for convenience the representation of clock pulses of the same width as the time intervals of the outputs for each stage of the main shift register. Accordingly, shifting of data through the successive stages of both the main and auxiliary registers is indicated as occurring following the trailing edge or at the termination of each of the time intervals $T_n$ where $n=1, 2, 3$ as to the main register and $n = 4, 8, 12 \ldots$ as to the auxiliary register. More precisely, of course, the logic state of each stage is read-out on the leading edge of the next occurring common, or read-out clock $\phi_1$ following each characteristic clock applied thereto —i.e., $\phi_2$ as to the main register and $\phi_3$ as to the auxiliary register. More precisely, setting is achieved simultaneously with the initiation of the respectively next successive interval, e.g. $T_n$ where $n = 5, 9, \ldots$.

In relating the timing charts to the forgoing discussing, consider first Chart 1D which during timing interval $T_{12}$ illustrates the application of the signal X to OR gate 4 and hence the signal Z to the auxiliary shift register stage $B_1$, that stage being set following the trailing edge of pulse $T_{12}$ and thus at the initiation of pulse $T_{13}$ to store a logic "1" therein for the time interval $T_{13}$ to $T_{16}$. That "1" bit advances successively through the stages of the auxiliary register for every fourth clock pulse while the one bit in the main register advances successively through the stages thereof for every single pulse as may be traced from contents table of FIG. 1D, as well as FIGS. 1B and 1C.

Figure 1E:
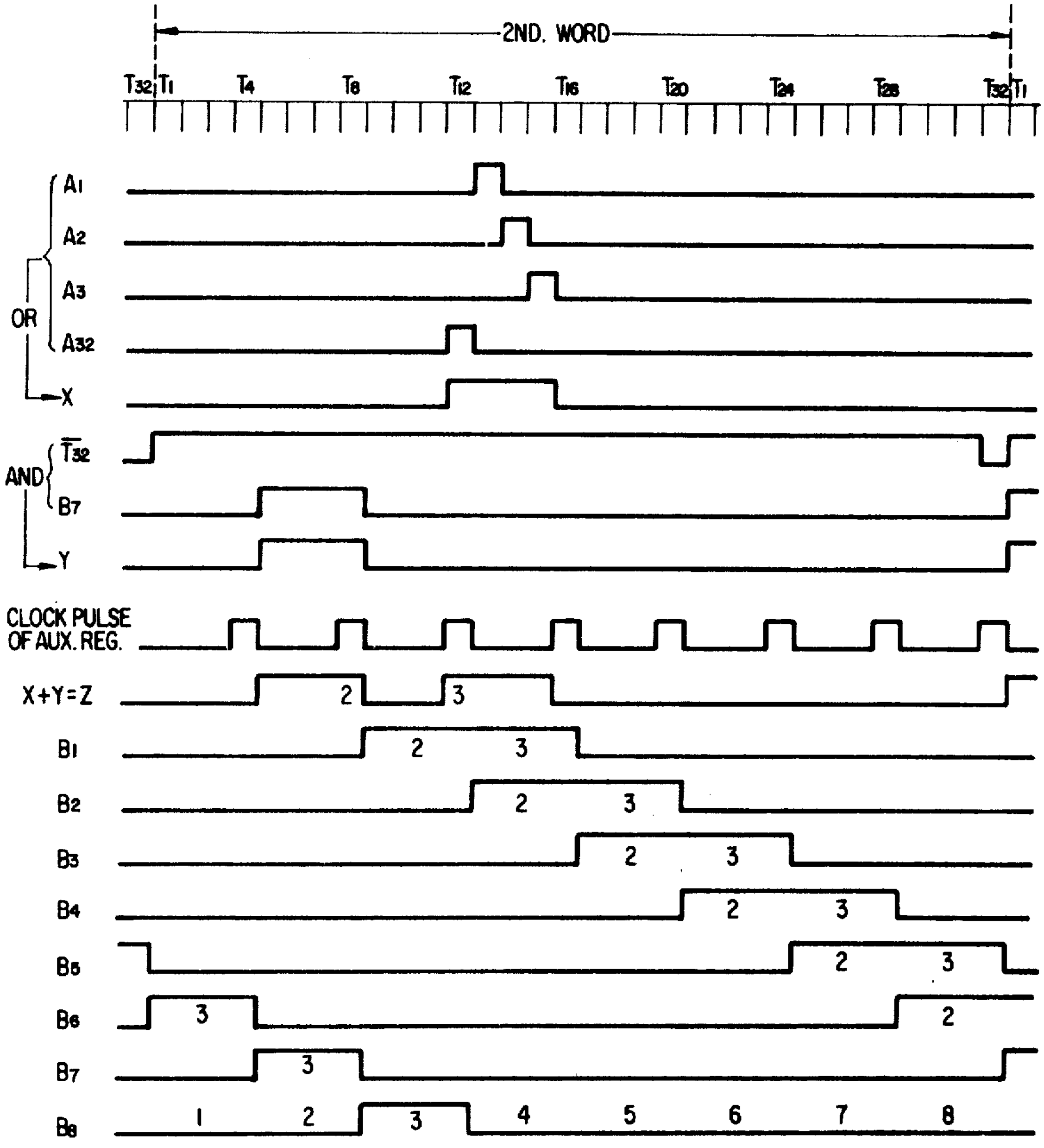
Figure 1F:
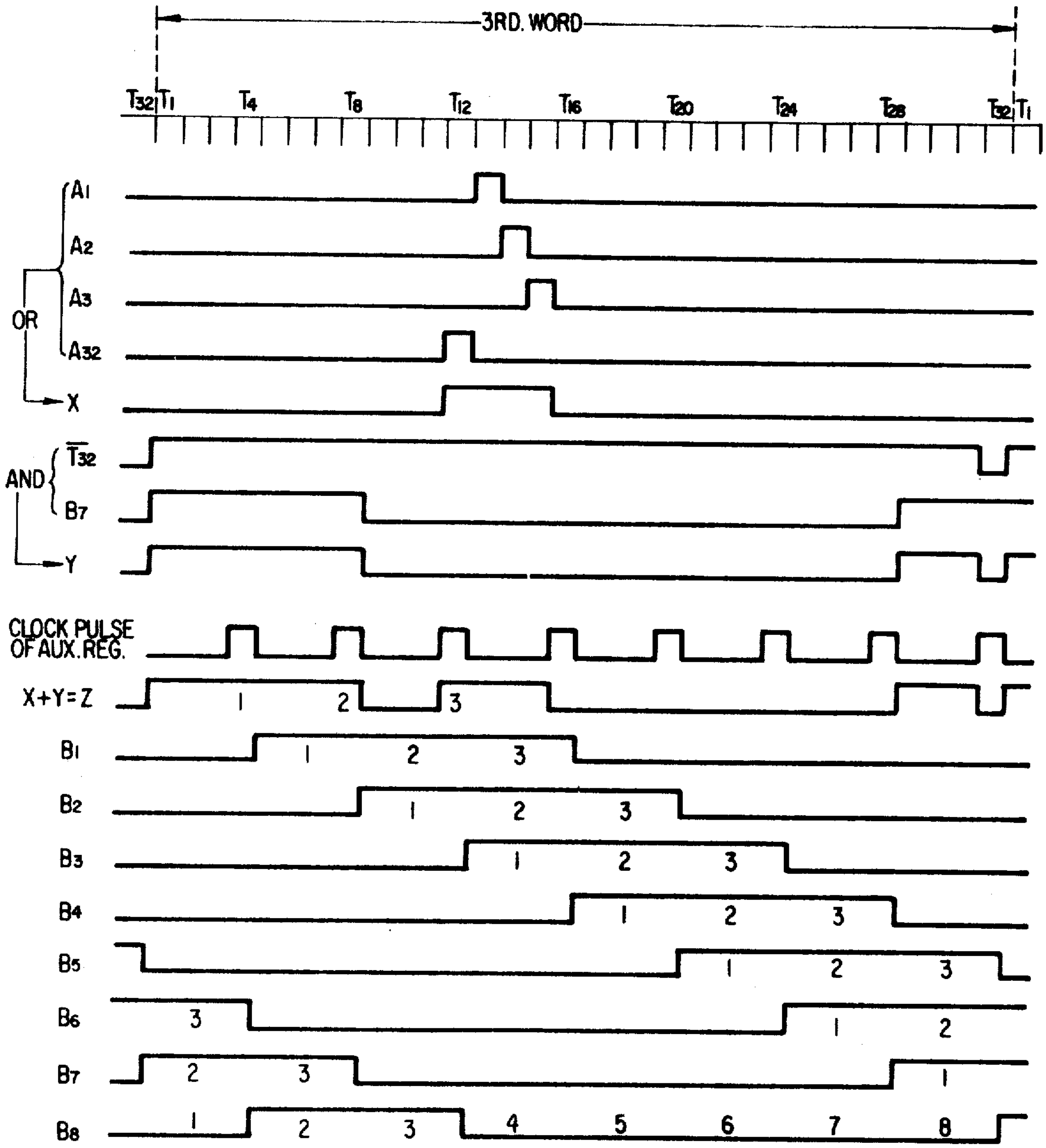
Figure 1G:
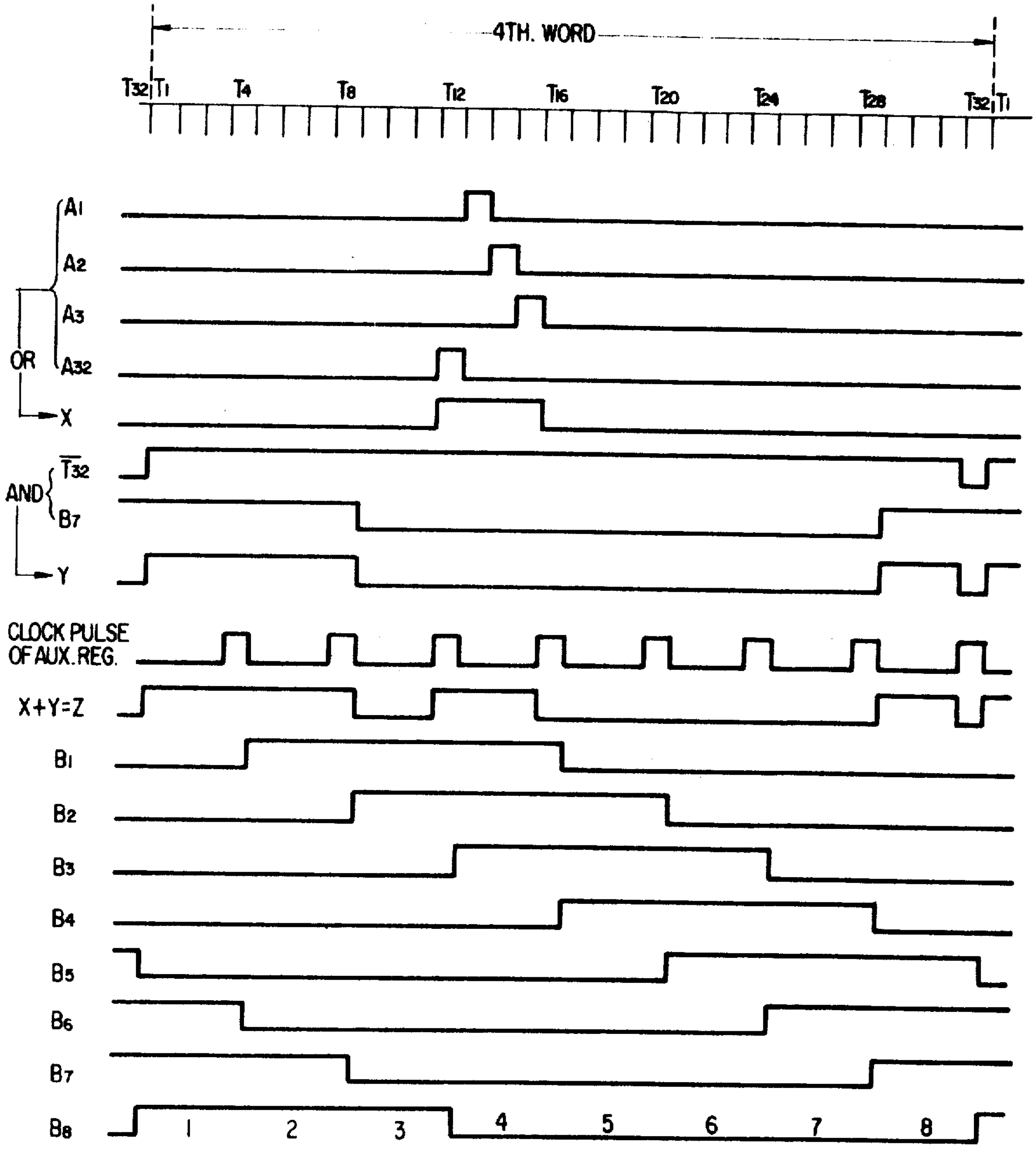
Figure 1H:
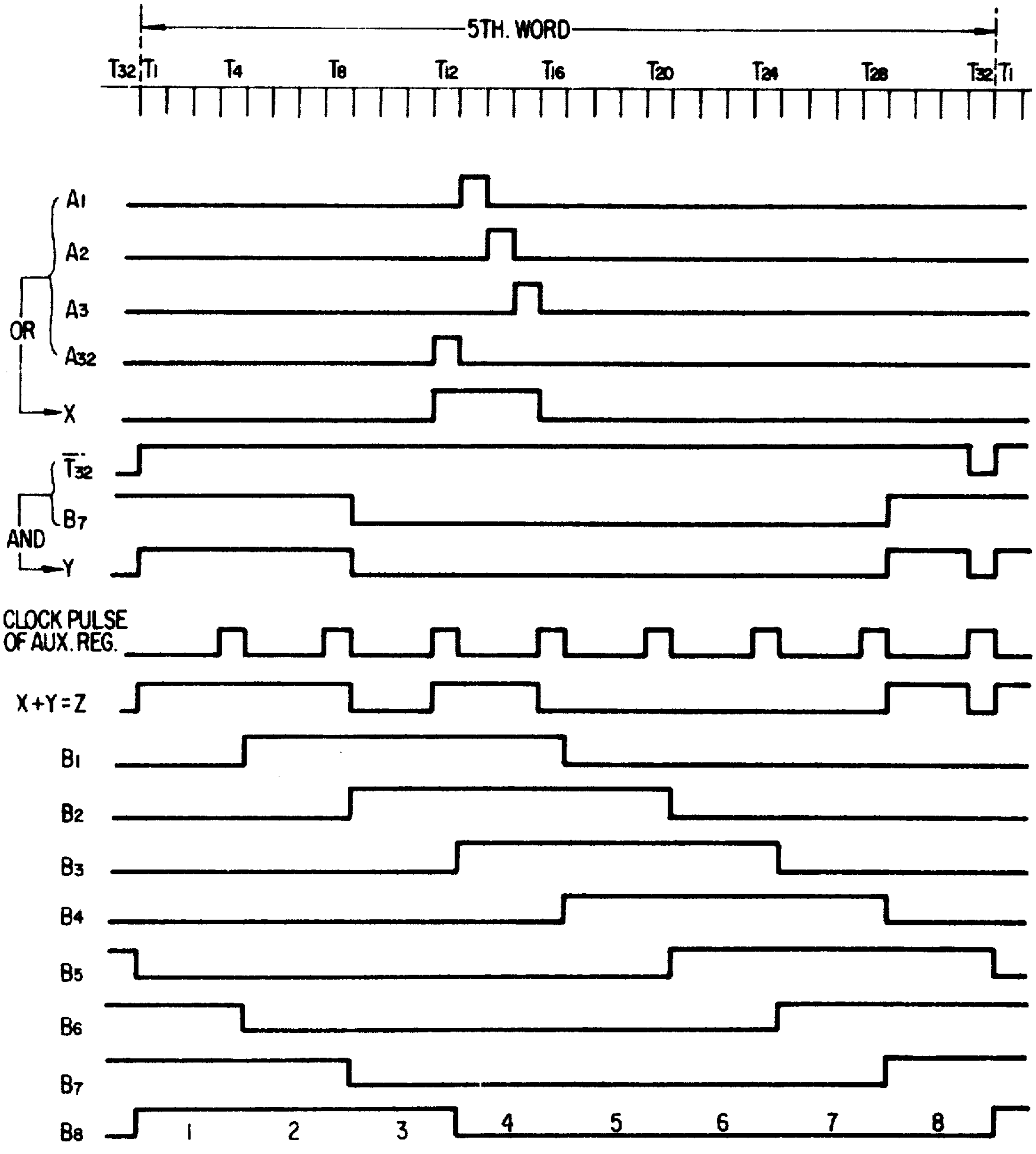

Proceeding then to FIG. 1E, and as above described in detail, the bit pattern "10000001" is established in the auxiliary register for the time period of pulses $T_9$ through $T_{12}$. This pattern is also of interest in that it demonstrates for the immediately preceding interval of pulses $T_5$ through $T_8$, the logic "1" bit stored in the preceding stage $B_7$ which then through the AND function of AND gate 6 produces a Y signal and, through OR gate 4, in turn, a Z signal of a "1" value which, at the end of pulse $T_8$ and thus at the beginning of pulse $T_9$ is written into the first stage $B_1$ of the auxiliary register. Note as well that the logic "1" again has advanced to stage $A_{32}$; hence, at the end of interval $T_{12}$, and thus in the succeeding intervals $T_{13}$ through $T_{15}$, is present successively in the stages $A_1$ through $A_3$, respectively, producing the signal X. The OR function of X with Y producing the signal Z supplies a logic "1" bit which is written into the first stage $B_1$ as there indicated. The tracing of the bit pattern through the registers may then readily be followed from the foregoing description, the final bit pattern "00000111" produced during the period $T_1$ through $T_4$ of the fourth repitition cycle as above noted corresponding to the bit pattern represented for the fourth word in FIG. 1G. FIG. 1H is included to demonstrate that, as the foregoing description indicated, the last-mentioned bit pattern circulates through the auxiliary register and is repeated identically for fifth word and specifically the desired pattern "00000111"is again present in the interval of pulses $T_1$ through $T_4$. Hence, it is apparent that this pattern continues until such time as the information stored in the main register is altered.

Figure 1I:
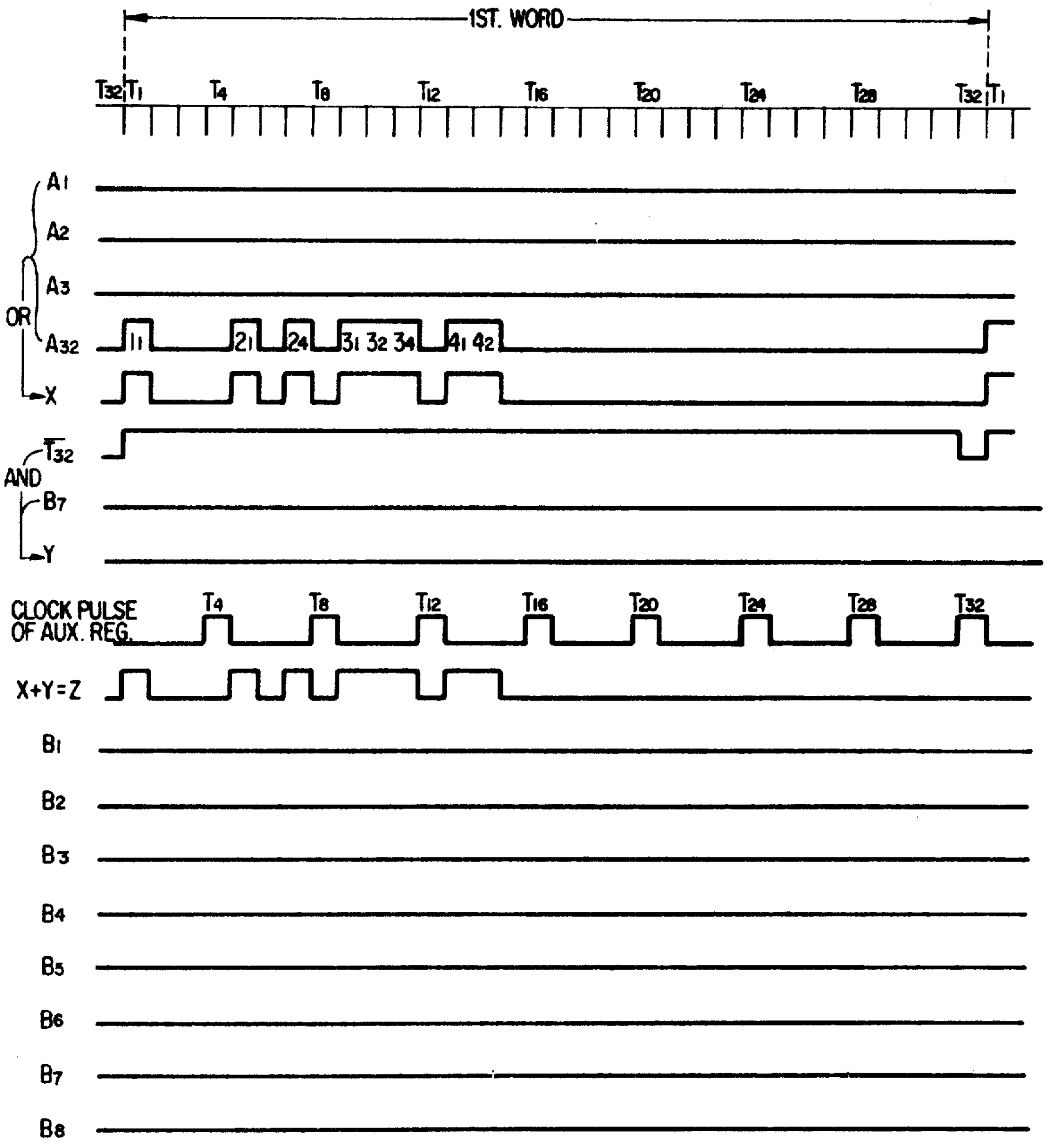
Figure 1J:
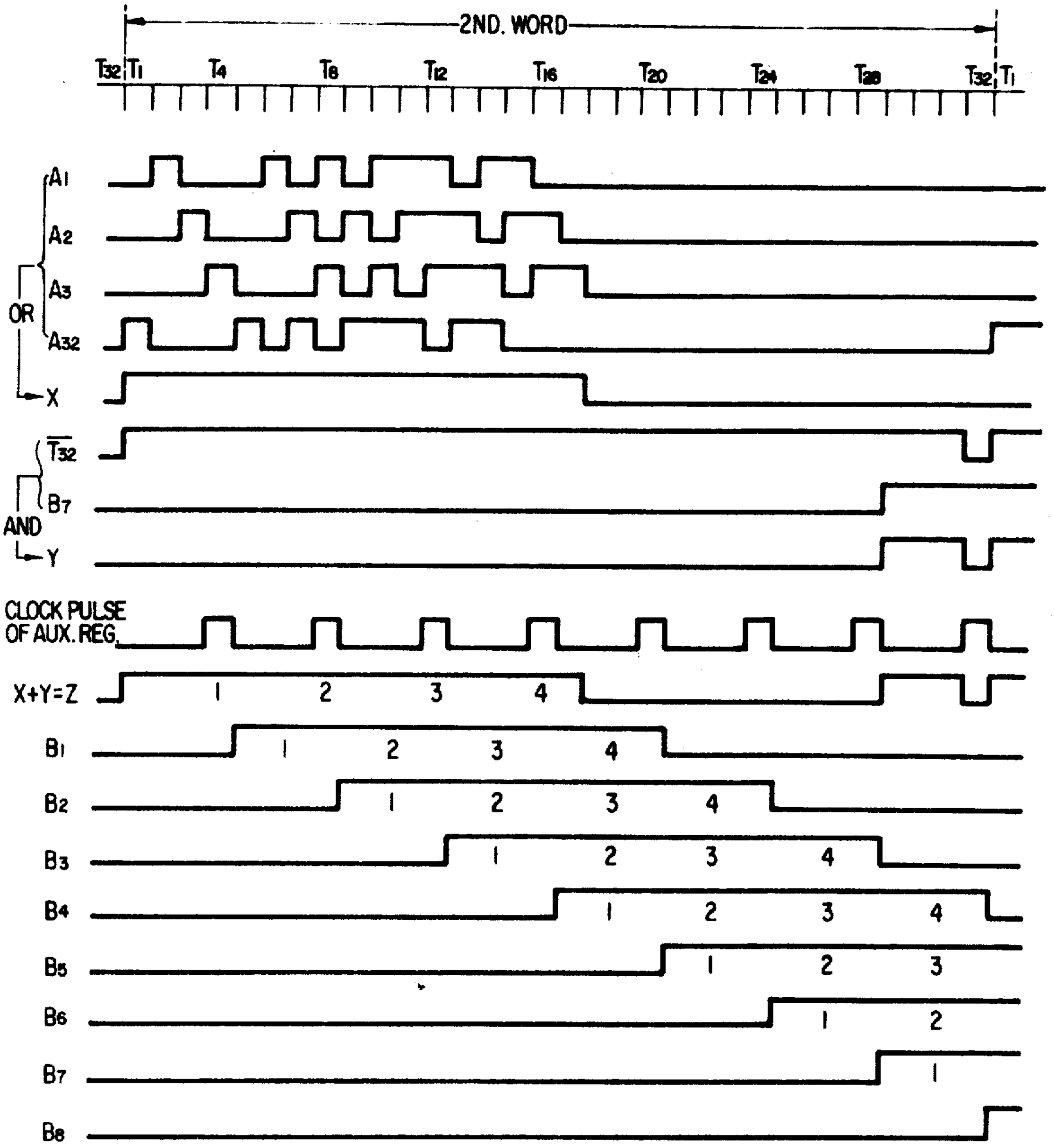
Figure 1K:
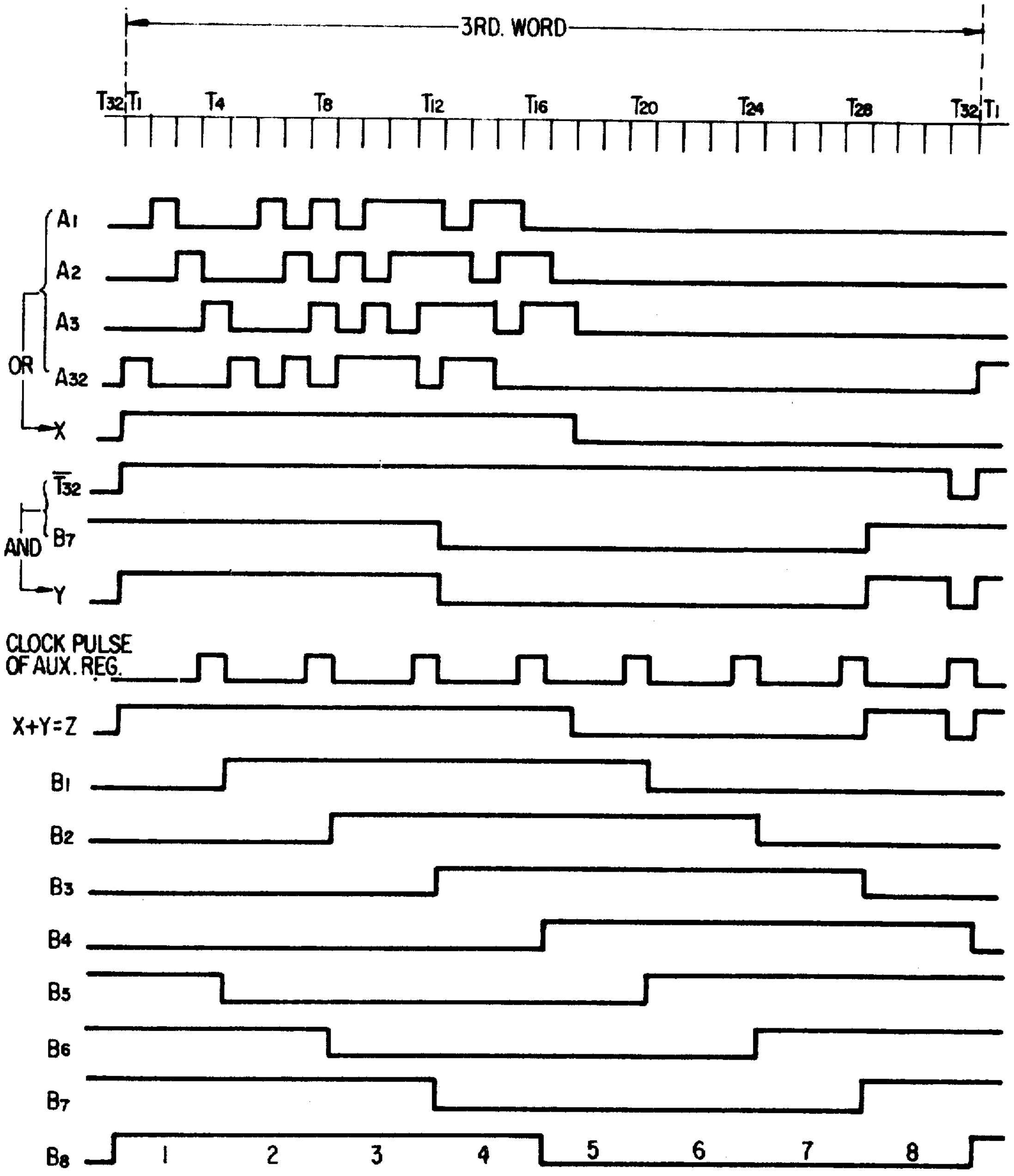

As a second example of the operation of the system of FIG. 1, let it be assumed that the numerical information to be registered in the main shift register 1 is a decimal number constituted of a plurality of digits each being a numeral other than "0," say "3751." Further let it be assumed that the decimal number is registered in accordance with the binary decimal code The time charts of FIGS. 1I through 1K illustrate the operation in this example.

The bit pattern or contents of the main shift register 1 at the time of timing pulse $T_1$ is shown in the Table III.

TABLE III

| Bit of main register | $A_{14}$ | $A_{15}$ | $A_{16}$ | $A_{17}$ | $A_{18}$ | $A_{19}$ | $A_{20}$ | $A_{21}$ | $A_{22}$ | $A_{23}$ | $A_{24}$ | $A_{25}$ | $A_{26}$ | $A_{27}$ | $A_{28}$ | $A_{29}$ | $A_{30}$ | $A_{31}$ | $A_{32}$ |
|---|---|---|---|---|---|---|---|---|---|---|---|---|---|---|---|---|---|---|---|
| Logical state | 0 | 0 | 0 | 0 | 0 | 1 | 1 | 0 | 1 | 1 | 1 | 0 | 1 | 0 | 1 | 0 | 0 | 0 | 1 |

The logic "1" in the bit $A_{32}$ at the time of pulse $T_1$ arrives at the bit $B_1$ of the auxiliary shift register 3 through both OR gates 5 and 4 and is ready to be written into the bit $B_1$ as a function of the timing pulse $T_4$ as a clock pulse. At the time of timing pulse $T_2$, the logics "1" in bits $A_{32}$, $A_{28}$, $A_{26}$, $A_{24}$, $A_{23}$, $A_{22}$, $A_{20}$ and $A_{19}$ are transferred or shifted to the bits $A_1$, $A_{29}$, $A_{27}$, $A_{25}$, $A_{24}$, $A_{23}$, $A_{21}$ and $A_{20}$, respectively. At the same time the logic "1" in the bit $A_1$ shifted from the bit $A_{32}$ arrives at the bit $B_1$ but is not written therein because no clock characteristic pulse is applied thereto at that time. Likewise, at the time of pulse $T_3$ every logic "1" in the main register 1 has been shifted by one bit and at the time of pulse $T_4$ has been further shifted by one bit.

Shown in the Table IV is the bit pattern or contents in the main register 1 at the time of pulse $T_4$.

TABLE IV

| Bit of main register | $A_1$ | $A_2$ | $A_3$ | $A_4$ | $A_5$ | $A_{20}$ | $A_{21}$ | $A_{22}$ | $A_{23}$ | $A_{24}$ | $A_{25}$ | $A_{26}$ | $A_{27}$ | $A_{28}$ | $A_{29}$ | $A_{30}$ | $A_{31}$ | $A_{32}$ |
|---|---|---|---|---|---|---|---|---|---|---|---|---|---|---|---|---|---|---|
| Logical state | 0 | 0 | 1 | 0 | 0 | 0 | 0 | 1 | 1 | 0 | 1 | 1 | 1 | 0 | 1 | 0 | 1 | 0 |

As seen from the table, at the time of pulse $T_4$ the logic "1" as originally stored in the bit $A_{32}$ has arrived at the bit $A_3$. Since the logic "1" in the bit $A_3$ at that time is applied to the bit $B_1$ of the auxiliary shift register 3 through both OR gates 5 and 4, the logic "1" is ready to be written therein as a function of the timing signal $T_4$ as a clock pulse. Thus at the time of timing pulse $T_5$ the logic "1" is present in the bit $B_1$. The bit pattern or contents of the auxiliary shift register 3 at that time is "10000000."This logical state in the register 3 is maintained during the period of pulses $T_5$ through $T_8$. This condition is illustrated in FIG. 1J.

Shown in the Table V is a bit pattern or contents of the main shift register 1 at the time of pulse $T_8$, which serves as a clock pulse of the auxiliary shift register 3.

TABLE V

| Bit of main register | $A_1$ | $A_2$ | $A_3$ | $A_4$ | $A_5$ | $A_6$ | $A_7$ | $A_8$ | $A_9$ | $A_{24}$ | $A_{25}$ | $A_{26}$ | $A_{27}$ | $A_{28}$ | $A_{29}$ | $A_{30}$ | $A_{31}$ | $A_{32}$ |
|---|---|---|---|---|---|---|---|---|---|---|---|---|---|---|---|---|---|---|
| Logical state | 1 | 0 | 1 | 0 | 0 | 0 | 1 | 0 | 0 | 0 | 0 | 1 | 1 | 0 | 1 | 1 | 1 | 0 |

As seen from the pattern, bits $A_1$ and $A_3$ store the logic "1," which is ready to be written and will be written at the time of pulse $T_9$ into the bit $B_1$. At the same time the logic "1" stored in the bit $B_1$ is shifted to the bit $B_2$. Thus the bit pattern of the auxiliary shift register 3 at the time of the signal $T_9$ is "11000000." This logical state is kept up to the time of pulse $T_{12}$. This state is illustrated again in FIG. 1J.

The bit pattern of the main shift register 1 at the time of pulse $T_{12}$ is shown in the Table VI.

is "10000111." Thereafter, the same shift as mentioned above is repeated and the bit pattern or contents of the auxiliary shift register 3 is kept unchanged unless the numerical information in the main shift register 1 is changed.

Thus, even in the case of numerical information consisting of a plurality of numerals all other than "zero," the logic "1" comes to be stored only in the bits of the auxiliary shift register 3 corresponding to the digits of the numerical information in the main shift register 1.

TABLE VI

| Bit of main register | $A_1$ | $A_2$ | $A_3$ | $A_4$ | $A_5$ | $A_6$ | $A_7$ | $A_8$ | $A_9$ | $A_{10}$ | $A_{11}$ | $A_{12}$ | $A_{13}$ | $A_{28}$ | $A_{29}$ | $A_{30}$ | $A_{31}$ | $A_{32}$ |
|---|---|---|---|---|---|---|---|---|---|---|---|---|---|---|---|---|---|---|
| Logical state | 1 | 1 | 1 | 0 | 1 | 0 | 1 | 0 | 0 | 0 | 1 | 0 | 0 | 0 | 0 | 1 | 1 | 0 |

As seen from the pattern, the logic "1" as originally stored in the bits $A_{22}$, $A_{23}$ and $A_{24}$ has arrived at the bit $A_1$, $A_2$ and $A_3$, respectively, and is applied through the OR gates 5 and 4 to the bit $B_1$, into which the logic "1" is written following the end of pulse $T_{12}$ and this is present therein at the time of pulse $T_{13}$. At the same time, the logic "1" stored in the bits $B_1$ and $B_2$ is shifted to the bits $B_2$ and $B_3$, respectively. The bit pattern of the auxiliary shift register 3 at time of pulse $T_{13}$ is "11100000." This logical state is retained up to the end of pulse $T_{16}$.

The logical state of the main shift register 1 at the time of the pulse $T_{16}$ is shown in the Table VII.

Since the said numerical information includes numerals other than zero in every digit in the last example, an ultimate bit pattern is obtained during only one repetition cycle of the timing pulses. If the information registered in the main register 1 had included a single zero in any digit other than the most significant one (excluding the surplus and non-used more significant bit positions available in the main register), the ultimate bit pattern would have been obtained after two repetition cycles of the timing pulses.

This bit pattern in the auxiliary shift register at the time of the timing pulse $T_1$ is utilized to control the indicating means 2

TABLE VII

| Bit of main register | $A_1$ | $A_2$ | $A_3$ | $A_4$ | $A_5$ | $A_6$ | $A_7$ | $A_8$ | $A_9$ | $A_{10}$ | $A_{11}$ | $A_{12}$ | $A_{13}$ | $A_{14}$ | $A_{15}$ | $A_{16}$ | $A_{17}$ | $A_{18}$ |
|---|---|---|---|---|---|---|---|---|---|---|---|---|---|---|---|---|---|---|
| Logical state | 0 | 1 | 1 | 0 | 1 | 1 | 1 | 0 | 1 | 0 | 1 | 0 | 0 | 0 | 1 | 0 | 0 | 0 |

As seen from the table, each of the bits $A_2$ and $A_3$ store the logic "1," which is applied to the bit $B_1$ and is written thereinto following the end of pulse $T_{16}$ and therefore present therein at the time of pulse $T_{17}$. At the same time, the logic "1" of the bits $B_1$, $B_2$ and $B_3$ is shifted to the bit $B_2$, $B_3$ and $B_4$, respectively. The bit pattern of the auxiliary shift register 3 at that time is "11110000." (See FIG. 1J which illustrates this pattern for the interval $T_{17}$ to $T_{20}$.) At the time of pulse $T_{20}$ no logic "1" is stored in the bit $A_{32}$, $A_1$, $A_2$ and $A_3$. Therefore, the bit pattern or contents of the auxiliary shift register 3 at time $T_{22}$ through $T_{24}$ is "01111000." Likewise, the bit pattern at the auxiliary shift register 3 at the time of pulse $T_{25}$ is "00111100" and at the time of pulse $T_{29}$ is "00011110." This logical state or bit pattern "00011110" is retained up to the time of pulse $T_{32}$. The logic "1" in the bit $B_7$ during this period is applied through the AND gate 6 to the bit $B_1$. However, the said logic "1" is not written into the bit $B_1$, since the AND gate 6 is closed at the time of pulse $T_{32}$, as mentioned previously. Thus the first repetition cycle of the timing pulses $T_1$ through $T_{32}$ ends. The bit pattern or contents of the auxiliary shift register 3 at the time of pulse $T_1$ of the second repetition cycle is "00001111."

The foregoing patterns are as well illustrated in FIG. 1J, up to the final pattern of "00000111" which for the time interval $T_1$ through $T_4$ is now shown in FIG. 1K. This pattern, as will be appreciated, now repeats as was demonstrated for the prior example in FIGS. 1G and 1H.

At the time of pulse $T_4$, which serves as a clock pulse of the auxiliary shift register 3, the logic "1" is written into the bit $B_1$ from the main shift register 1 as well as the bit $B_7$ of the register 3. Bit pattern of the auxiliary shift register 3 at that time so that the numerical information of only the effective digits is caused to be indicated while the remaining more significant digits are prevented from being indicated by means of the indicating means 2.

Figure 2:
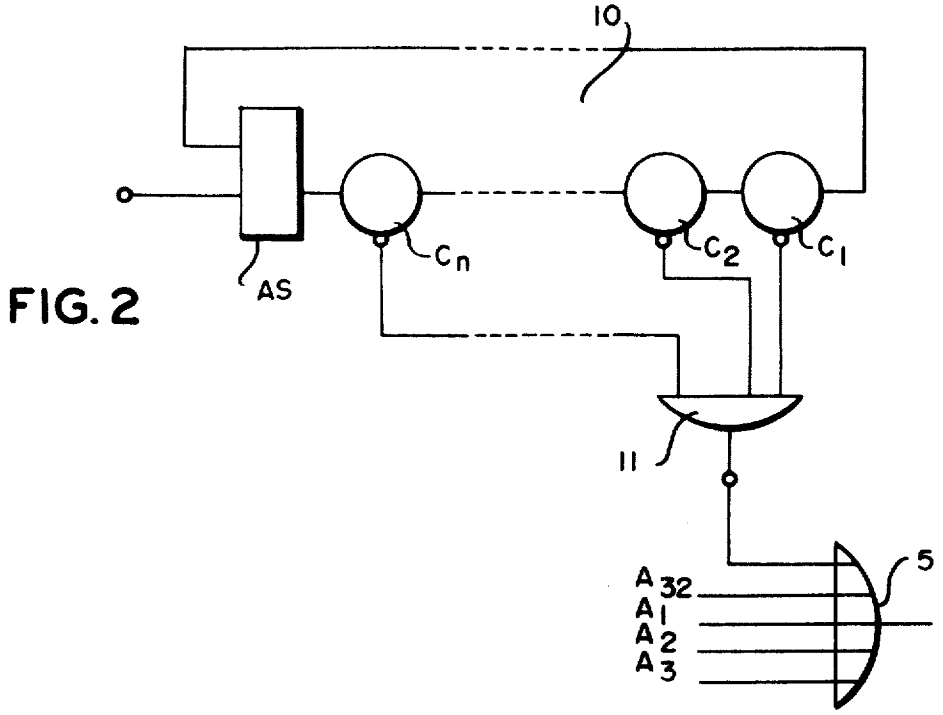
FIG. 2 shows a block diagram of an additional device for use in indication of decimals.

An example of operation in case of registration of decimals in the main register will now be discussed. A block diagram of an additional device for use in indication of decimals is shown in FIG. 2, and is adapted to be attached to the system shown in FIG. 1. The device comprises a counter 10 having counter elements $C_1$, $C_2$, . . . $C_n$ and an AND gate 11, the input of which is a complement output of each counter element. The output of the AND gate 11 is applied to the input of the second OR gate 5, which is the same as shown in FIG. 1.

Counter elements $C_1$, $C_2$, . . . $C_n$ are, for example, flip-flops arranged to correspond to, for example, "1," "2," "4," and "8" codes respectively of the "8–4–2–1" code. For the purpose of the circulation in the counter 10, the element $C_1$ is connected to element $C_n$ through an adding-and-subtracting means AS, another input of which is a subtraction command signal. For the purpose of counting the number of decimal places of the decimals in synchronism with the circulation in both registers 1 and 3 the said number of decimal place of the decimals is introduced into the counter 10 by a suitable means. The counter 10 is so constructed that a down count is effected as a function of every fourth timing pulse $T_4$, $T_8$, . . . $T_{32}$ fed to the means AS as subtraction command signals. Now let it be assumed that numerical information consisting of the decimal "0.01" is registered in the main shift register 1. At the time of timing pulse $T_1$ the logic "1" is stored in the bit $A_{32}$ of the main shift register 1, while the decimal number "2" is stored in the counter 10, i.e., the logic "1" is stored in the element $C_2$ which corresponds to "2" code of the 8–4–2–1 code. At the time of the timing pulse $T_{32}$ of the preceding repetition cycle the logic "1" is ready to be written into the bit $B_1$ of the auxiliary shift register 3 from the main shift register 1. At the time of timing pulse $T_1$ the bit pattern of the auxiliary shift register 3 is "10000000." At the same time the contents of the counter 10 becomes the decimal number "1," i.e., the logic "1" is stored in the element $C_1$ which corresponds to "1" code of the 8–4–2–1 code. After the next write time of the pulse $T_8$ the bit pattern of the auxiliary shift register 3 becomes "01000000." At the time of pulse $T_{12}$ no logic "1" is stored in the counter 10, namely the logic "0" is stored in all elements $C_1$ through $C_n$. As a result the logic "1" is obtained as a complement output from all the elements $C_1$ through $C_n$, which satisfies the input condition of the AND gate 11. The output logic "1" from the gate 11 is applied through both OR gates 5 and 4 to the bit $B_1$ of the auxiliary shift register 3 and the bit pattern of the register 3 becomes "10100000."

As described previously, accordingly, as the bit pattern of the main shift register 1 as well as the auxiliary shift register 3 is shifted, the logic "1" is rewritten into the all corresponding bits of the auxiliary shift register 3 based on the logic "1" written from the counter 10 through the gates 11, 5 and 4 and an ultimate bit pattern of the register 3 at the time of timing pulse $T_1$ is "00000111," which serves to suppress the undesired indication of zero in the more significant digits, resulting in the indication of only "0.01" in the indicating means 2.

Thus, even in case the numerical information is a decimal, the desired indication is obtainable in the same way as before, in accordance with the invention by employing the simple additional device as described above.

In the preceding examples of operation actual numerical information was assumed to have been stored in main register 1. An example of operation will now be described in which no information is registered in main register 1. Intuitively, it would seem that no numeral is indicated by the indicating means 2, as a consequence of the same operation as described above. The fact is, however, that the logic "0" in all bits of the main shift register 1 means that the decimal point is stored as well in the least significant digit of the register 1 assuming that the device shown in FIG. 2 is employed. Therefore, the counter 10 shown in FIG. 2 operates to cause the logic "1" to appear at the output of the AND gate 11. The said logic "1" is written into the corresponding bit of the auxiliary shift register 3 accordingly and the bit pattern of the register 3 at the time of timing pulse $T_1$ is "0000000 ." Thus the decimal number "0" is indicated only in the least significant digit by means of the indicating means 2.

In the embodiment disclosed in FIG. 1, the logic "1" was adopted in an ultimate bit pattern obtained in the auxiliary shift register 3 to represent the digit position of the main shift register 1 in which the desired information is stored, while the logic "0" was indicative of the digit position of the undesired "zero" in the more significant digits. However, exactly the same result is obtainable by reversing the relation between the logic "1" and logic "0" in the bit pattern obtained in the register 3 and changing the polarity of the signal applied from the auxiliary shift register 3 to the control circuit 7 as compared with the FIG. 1 embodiment.

Other Embodiments

Figure 3:
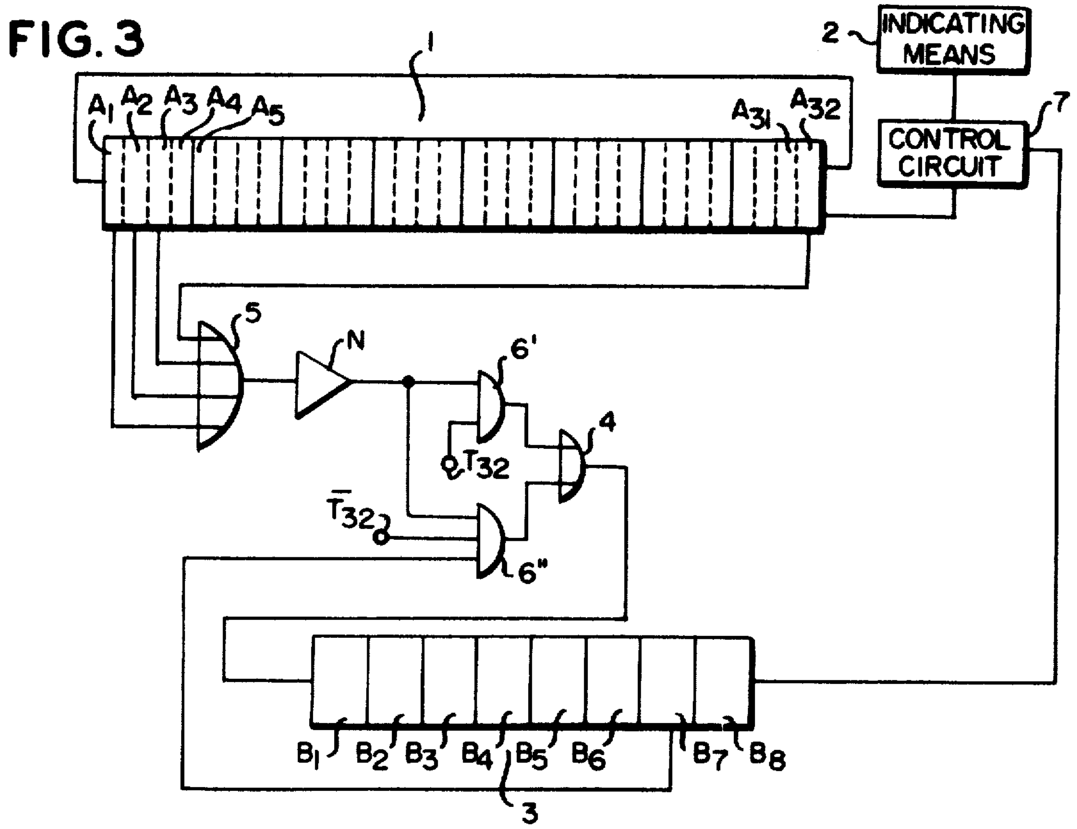
FIG. 3 shows a block diagram of another embodiment in accordance with the invention.

FIG. 3 shows a block diagram of an alternate embodiment employing the reversed bit pattern. Referring to FIG. 3, the output of the OR gate 5 is connected to the input of an inverter circuit circuit N, the output of which is applied to the input of AND gates 6′ and 6″. Another input to the gate 6′ is the timing pulse $T_{32}$. Other inputs to the gate 6″ are the logical state of the bit $B_7$ of the register 3 and the pulse $\overline{T_{32}}$, the complement of the pulse $T_{32}$. The output of each gate 6′ and 6″ is connected through the OR gate 4 to the most significant bit $B_1$ of the auxiliary shift register 3. Other connections are the same as that of FIG. 1. The operation of the system shown in FIG. 3 is readily understood by referring to the foregoing description in connection with the FIG. 1 embodiment and by taking the reversed logical state into consideration.

Let it be assumed that a decimal number "00000800" has been introduced to the main shift register 1. Circulation is made in the main register 1 as a function of timing pulses $T_1$ through $T_{32}$.

At the time of timing pulse $T_{32}$ of the first repetition cycle the logic "1" comes to the bit $A_{20}$ and no logic "1" is stored in the bit $A_{32}$, $A_1$, $A_2$ and $A_3$. Therefore, the logic "1" output is obtained for the first time from the gate 6′ and is written into the bit $B_1$ of the auxiliary register 3 at the time of timing pulse $T_1$ of the second repetition cycle. It should be noted that the written logic "1" is representative of no information being stored in the most significant digit of the main register 1. At the time of timing pulse $T_{28}$ of the second repetition cycle the logic "1" is stored in the bit $A_{16}$ of the main register 1 and the bit $B_7$ of the auxiliary register 3. The written logic "1" in the bit $B_7$ is rewritten into the bit $B_1$ through the gate 6″. The rewrite from bit $B_7$ to bit $B_1$ is continued until the logic "1" output is not obtained from the inverter circuit circuit N at the time of rewrite, i.e., the logic "1" of the most significant digit of the decimal number in the register 3 exists in bit $A_{32}$, $A_1$, $A_2$ and/or $A_3$ at the time of rewrite. It should be noted that the rewrite is inhibited just at the time of pulse $T_{32}$, since one input of the gate 6″ is the pulse $\overline{T_{32}}$, the complement of pulse $T_{32}$. Thus it is seen that the ultimate bit pattern obtained in the register 3 during the period of pulses $xT_1$ through $T_4$ is "11111000."

The bit pattern can be utilized to control the indicating means 2 by changing the polarity of the output signal as compared with the FIG. 1 embodiment. The operation in case of other numbers being registered in the register 1 can be explained similarly and therefore further explanation is omitted.

In the previously described embodiments, the main shift register 1 was implemented by connecting all the bits in series. The invention, however, is applicable also to such a register that a plurality of digits each having the bits connected in series are connected in parallel. In such an embodiment the main register makes the circulation operation in synchronism with the timing pulses of the same number as that of the said digit. Therefore, the same result is obtainable by making the auxiliary shift register 3 circulate as a function of exactly the same timing pulses.

Figure 4:
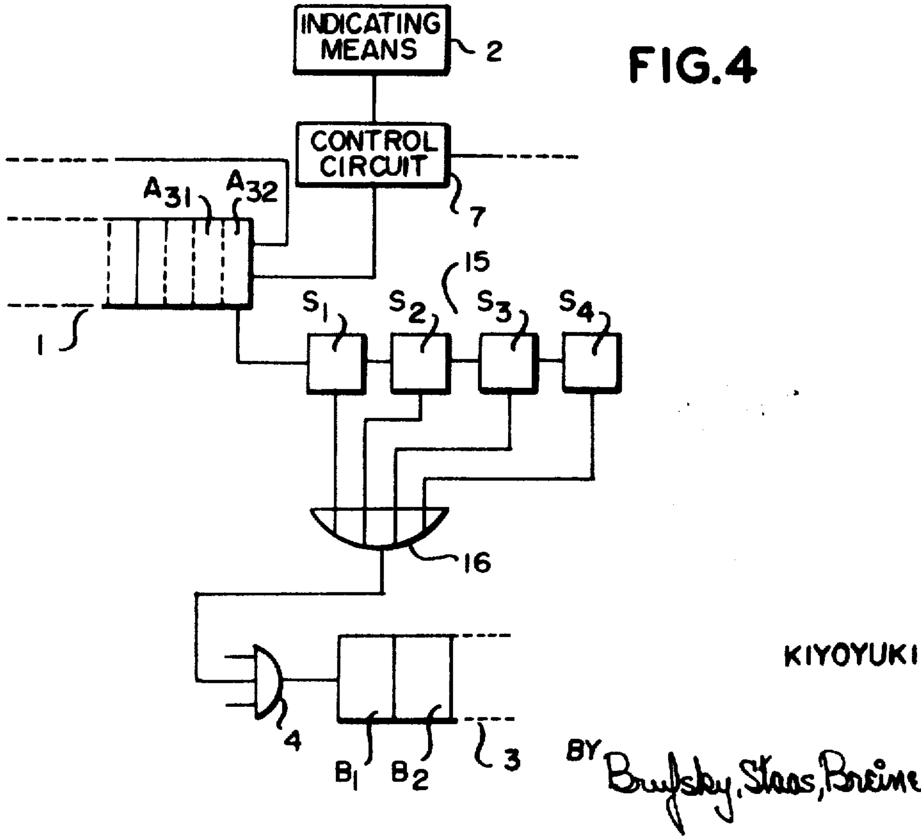
FIG. 4 shows a block diagram of a further embodiment in accordance with the invention.

Though in any embodiments as described previously the logical sum based on the logical state from the selected four consecutive bits was introduced to the auxiliary shift register 3, an alternate embodiment in this connection is shown in FIG. 4. Referring to FIG. 4 a buffer circuit 15 constituted of four-bit shift elements $S_1$, $S_2$, $S_3$ and $S_4$ is connected to the least significant bit $A_{32}$ of the main shift register 1. The buffer circuit 15 is operated as a function of the timing pulses $T_1$ through $T_{32}$ and the logical sum obtained through OR gate 16 from the shift elements $S_1$, $S_2$, $S_3$ and $S_4$ is applied to the auxiliary shift register 3. Thus completely the same result is obtainable.

In view of the fact that fewer connections between the main shift register 1 and the auxiliary shift register 3 are involved as compared with any previously described embodiments, this embodiment may be advantageously adopted to reduce the number of such connections.

Figure 5:
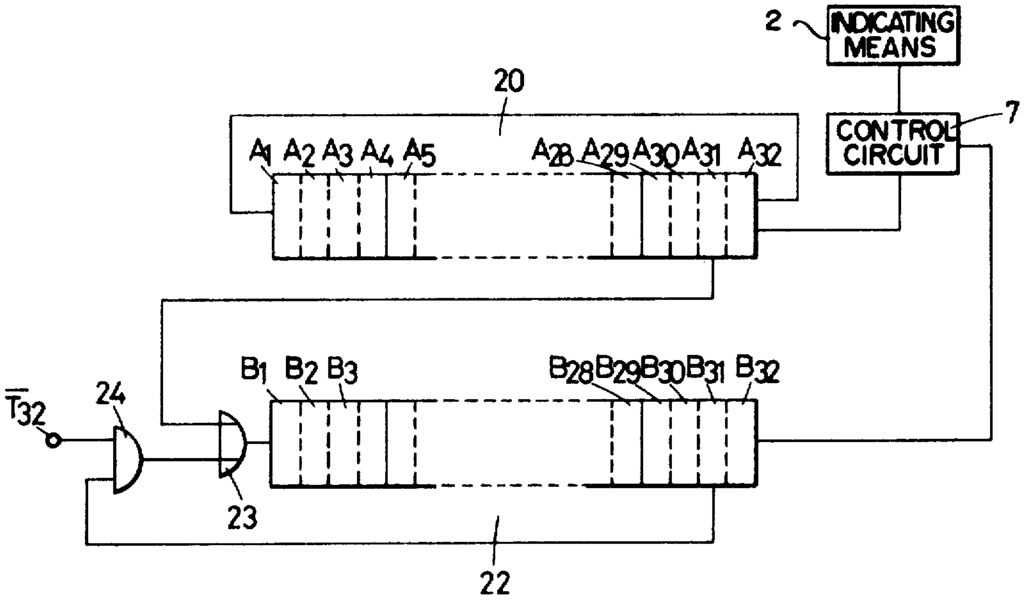
FIG. 5 shows a block diagram of still a further embodiment of the invention.

Shown in FIG. 5 is a block diagram of still a further embodiment of the invention, in which the auxiliary shift register is composed of the same number of bit-storing elements as the main shift register, for simplicity of the overall structure.

Referring to FIG. 5, a main shift register 20 is composed of elements having a total storage capacity of eight digits each having four bits. The total 32 bits are arranged in series, these bits being denoted from the most significant digit in turn as $A_1$, $A_2$, $A_3$, . . . up to the least significant digit as $A_{32}$, and the element for the least significant digit $A_{32}$ is connected to the element for the most significant digit $A_1$ for the purpose of circulation of the information in the register 1. Connected to the register 1 is provided an indicating means 2, so as to be controlled by the control circuit 7. Apart from the main shift register 20 is provided an auxiliary shift register 22 having the same number of bit storage elements as the main register, for the total 32 serially arranged bits, these bits being similarly denoted from the most significant bit in turn as $B_1$, $B_2$, $B_3$ . . . up to the least significant bit as $B_{32}$. Connected to the most significant bit $B_1$ of the register 22 is an OR gate 23, the inputs of which are obtained from the bit $A_{31}$ next to the least significant bit $A_{32}$ of the register 20 and from an output of an AND gate 24. One input of the AND gate 24 is connected to receive the bit $B_{31}$ of the register 22 and the other input of AND gate 24 is the source of the pulse $\overline{T_{32}}$ which is the complement of the 32nd timing pulse $T_{32}$.

In the same manner as described above, circulation in the auxiliary shift register 22 is made in synchronism with the circulation in the main shift register 20. During such circulation the logic "1" is written into the auxiliary shift register 22 bit by bit in accordance with the bit pattern or contents of the numerical information stored in the main shift register 20 and ultimately the bit pattern or contents corresponding to the said numerical information is obtained in the auxiliary shift register 22.

Assuming, for example, that the decimal number "800" is stored in the main shift register 20, the ultimate bit pattern or contents of the auxiliary shift register 22 at the time of timing pulse $T_{32}$ shows the logic "0" in the bits $B_1$ through $B_{20}$ and the logic "1" in the bits $B_{21}$ through $B_{32}$. In accordance with this bit pattern the indicating means 21 is energized in the same manner as described previously.

As seen from comparison of FIG. 5 embodiment with FIG. 1 embodiment, the circuit implementation has been simplified, as only a single connection is provided between the main shift register 20 and the auxiliary shift register 22 in FIG. 5 embodiment. This is particularly advantageous in mechanizing a large scale integrated circuit wherein such shift registers are comprised in a single package, in view of the reduced number of connections.

Though the term "indicating means" has been used in the foregoing description as an ultimate output system of the information, such means may take various forms, such as indicating tubes generally known as "Nixie tube," cathode ray tubes, printing machines, etc.

For the purpose of rewriting and circulation in the auxiliary shift register 3, a connection was provided between the most significant bit $B_1$ and the bit $B_7$ (or the bit $B_{31}$) next to the least significant bit $B_8$ (or the bit $B_{32}$) with certain logic means included in the foregoing embodiments. From the foregoing description it is seen that such connection serves to circulate the written or rewritten logic "1" and rewrite the said logic "1" into the bit which is one bit less significant than the bit in which the said logic is stored at the time of rewrite. Clearly the same result is obtainable by providing a connection between the second bit $B_2$ from the most significant digit $B_1$ and the least significant digit $B_8$ with the similar logic means inserted.

While specific preferred embodiments of the invention have been described it will be apparent that obvious variations and modifications of the invention will occur to those of ordinary skill in the art from a consideration of the foregoing description. It is therefore desired that the present invention be limited only by the appended claims.

I claim as my invention:

1. An information output system for use with a visual numerical display device having a plurality of digit display positions, said system providing for suppressing unnecessary zeros in the digit display positions of the display device exceeding the most significant digit of the number to be displayed, and comprising:

a first shift register having a plurality of information storing stages for registering numerical information in a first format;

means coupled to said first shift register for circulation of said numerical information therethrough in accordance with desired timing of shift;

a second shift register having a corresponding plurality of information storing stages for registering numerical information in a second format, said numerical information in said second shift register being shifted therethrough as a function of the timing of the shift of said first shift register means;

means coupled to said first register for responding to the numerical information of the first format circulating therein, for storing numerical information of the second format in each stage of the second register as to which the respectively corresponding stage of the first register contains numerical information identifying a non-zero digit of the number to be displayed;

means responsive to the numerical information of the second format shifting through said second shift register for developing in said second shift register numerical information in the second format indicative of all digit positions of the number to be displayed; and output means responsive to the numerical information in said first register and to the numerical digit position information developed in said second shift register, for producing a visual display of only so much of said numerical information circulating in said first shift register as identifies significant digits of the number to be displayed, and thereby to suppress display of undesired zeros in the digit positions of the display exceeding the most significant digit of the number to be displayed.

2. The information output system according to claim 1, further including:

means for establishing in said visual display the position of a decimal point in the number identified by the numerical information in said first shift register, further comprising:

counter means for storing the number of decimal places of a number to be displayed and identified by the numerical information in said first shift register;

means for adjusting the count in said counter means in synchronism with the shifting of said second shift register; and means responsive to a predetermined count of said counter means for controlling said developing means to develop numerical information of the second format indicative of digit positions to be displayed in accordance with the decimal point position in the number identified by the numerical information of said first shift register.

3. An information output system as recited in claim 1 wherein said first format is a plural bit coded digital format including a number of groups of coded digital bits corresponding to the number of digit positions of the display and identifying the digit in each position of the display, and said second format is a single bit digital format, and wherein:

each stage of said first register includes a number of bit storage elements corresponding to the number of coded bits for a single digit, and said means for developing numerical information of the second format in said second shift register is connected to predetermined ones of said bit storage elements of said first register for responding to each group of coded bits, in succession, to determine if a non-zero digit is identified thereby, and further is connected to a predetermined stage of said second register to insert a bit therein for each said group of coded bits identifying a non-zero digit, simultaneously with the circulation of the bits of each such group into the storage elements of the stage of said first register corresponding to said predetermined stage of the second register.

4. The information output system according to claim 3 wherein each of said digit storage stages of said first register comprises a plurality of bit storage elements of like number, connected serially for circulation of all bits of all groups therethrough simultaneously and in succession.

5. The information output system according to claim 3 wherein each of said storing stages of said second shift register comprises a single bit storage element.

6. A numerical information output system for use with a visual numerical display device having a plurality of digit display positions, said system providing for suppressing unnecessary zeros in the digit display positions of the display device exceeding the most significant digit of the number to be displayed, and comprising:

a first circulating shift register having a plurality of digit storing stages for storing a plurality of digits corresponding to the plurality of digit display positions of the display device, each digit storage stage comprising a predetermined number of bit storage elements for registering a decimal number in accordance with a plural bit code as represented by a pattern of logical states of a group of coded bits for each such digit;

means for effecting circulation of the contents of said first register;

a second circulating shift register having the same number of storing stages as the number of digit storage stages of said first register, said second register undergoing shift in synchronism with the shift in the first register as to the successive stages thereof;

means for sensing the logical state of a digit in a specified digit position of the first register as defined by a group of coded bits for a given digit stored in predetermined ones of the bit storage elements of said first shift register, and for writing said logical state into a specified storing stage of the second register as that group of bits circulates into associated storage elements of the respectively corresponding stage of the first register;

means responsive to the logical state written into said specified stage of said second shift register for rewriting that state into a stage of said second register which is one bit position less significant than that of the stage wherein the previously written logical state is stored, to provide in the second register logical state pattern indicative of the digit positions of the decimal number registered in the first register;

output means energized in accordance with the decimal number registered in the first register; and means for controlling the output means in accordance with the logical state pattern in the second register.

7. A numerical information output system in accordance with claim 6, wherein each storing stage of the second register is a one bit storage element.

8. A numerical information output system in accordance with claim 6, wherein each storing stage of the second register is constituted of the same predetermined number of plural bit storage elements as each stage of the first register.

9. A numerical information output system in accordance with claim 6, wherein said specified digit storage stage of the first register is a buffer circuit comprising a plurality of bit storage shift elements of the same predetermined number as the number of elements for each stage of the first shift register, and connected to receive the recirculating output from the last stage of said first shift register.

10. A numerical information output system in accordance with claim 6, wherein each non-zero digit of a decimal number to the displayed is represented by the combination of logics "1" and "0" and wherein:

said sensing and writing means includes a first logic gate connected to receive the outputs of a predetermined plurality of specified consecutive bit storage elements of the first register and to produce a logic "1" output whenever any bit of the group of bits stored therein is a logic "1" bit and writes said logic "1" into a specified storing stage of the second register at each time when the group of coded bits stored in said specified consecutive bit storage elements to said first register corresponds to an individual digit; and said rewriting means includes a second logic gate connected to receive the output of a given stage of said second shift register and to provide its output to the input of a different stage of said second shift register thereby to rewrite the previously written logic "1" into a storing stage of said second register which is one bit position less significant with respect to the storing stage wherein the previously written logic "1" is stored, to provide in the second register a logic "1" pattern indicative of the digit positions of the decimal number registered in the first register.

11. A numerical information output system in accordance with claim 10, wherein each stage of said first register includes N storage elements and each stage of said second register includes only a single storage element, which further comprises:

means for providing timing pulses, means for supplying the timing pulses to all elements of said first register, the logic bits in the storage elements of said first register being shifted to the respectively next successive storage elements and recirculated in accordance with each successive one of said timing pulses;

means for supplying every $N^{th}$ timing pulse to the storage elements of said second shift register, the logic bits in the storage elements of said second register being shifted as a function of every $N^{th}$ timing pulse, and said sensing, writing and rewriting means include:

a first OR gate receiving as inputs the logical states of the specified consecutive predetermined plurality of bit storage elements of the first register.

an AND gate receiving as inputs the logical state output of the bit element next to the least significant bit element of the second register and the complement of the final timing pulse of a group of said pulses equal in number to the number of storage elements of said first register and thus sufficient for making one circulation in the first register, a second OR gate receiving as inputs an output of the first OR gate and an output of the AND gate, and the output of which is supplied to the most significant bit element of the second register, and said gates are operative during repetition of circulation to produce a logic "1" pattern in the storage elements of the second register corresponding to all digit positions of the decimal number registered in the first register.

12. A numerical information output system in accordance with claim 10, wherein each stage of said second shift register has a corresponding plurality of digit storage elements as each stage of said first shift register and there is further provided:

means for providing timing pulses simultaneously to all bit storage elements of said first and second registers, to logic bits stored in said storage elements of each of said registers being shifted simultaneously to the respectively next successive storage elements and recirculated, in each of said registers in response to successive ones of said timing pulses; and said sensing, writing and rewriting means include:

an AND gate receiving as an input the logical state output of the bit storage element next to the least significant bit storage element of the second register and the complement of the final timing pulse of a group of said timing pulses equal in number to the number of storage elements of one of said registers and thus s required for making one circulation in each of said registers, and an OR gate receiving as an input the logical state output of the bit storage element next to the least significant one of the first register and the output of said AND gate, the output of said OR gate being supplied to the input to the most significant bit storage element of the second register.

13. A numerical information output system in accordance with claim 6, wherein each non-zero digit of a decimal number to be displayed is represented by the combination of logics "1" and "0" and wherein:

said sensing and writing means includes a first logic gate connected to receive the outputs of specified consecutive bit storage elements of said first register and to produce a logic "1" output only where no bit of the group of the group of bits stored therein is a logic "1" bit, and writes the logic "1", the complement of said no logic "1", into a specified storing stage of the second register when the group of bits in said specified plurality of bit storage elements of said first register currently represent the digit for the most significant digit position of the display; and said rewriting means includes a second logic gate connected to receive the output of a given stage of said second shift register and to provide its output to the input of a different stage of said second shift register thereby to rewrite the previously written logic "1" into a storing stage of said second register which is one bit position less significant with respect to the storing stage wherein the previously written logic "1" is stored, said second gate furthermore receiving the output of said first gate and enabled thereby only when the output of said first gate is a logic "1", thereby to provide in the second register a logic "1" pattern indicative of the undesired zeros in the digit positions of the display which are more significant than the most significant digit position of the decimal number registered in the first register; and said controlling means controls the output means in accordance with the logic "1" pattern in the second register so as to suppress the undesired zeros in the more significant digit positions of the display.

14. A numerical information output system in accordance with claim 13, wherein each stage of said first register includes N storage elements and each stage of said second register includes only a single storage element, which further comprises:

means for providing timing pulses;

means for supplying the timing pulses to all elements of said first register, the logic bits in the storage elements of said first register being shifted to the respectively next successive storage elements and recirculated in accordance with each successive one of said timing pulses;

means for supplying every $N^{th}$ timing pulse to the storage elements of said second shift register, the logic bits in the storage elements of said second register being shifted as a function of every $N^{th}$ timing pulse, and said sensing, writing and rewriting means include:

a first OR gate receiving as inputs the logical states of the specified consecutive predetermined plurality of bit storage elements of the first register, an inverter receiving as an input the output of said OR gate, a first AND gate receiving as inputs the output of said inverter and the final timing pulse of a group of said timing pulses equal in number to the number of storage elements of said first register and thus as required for making one circulation in the first register, and a second AND gate receiving as inputs the output of said inverter, the complement of said final timing pulse, and the logical state output of the bit storage element next to the least significant bit storage element of the second register, the outputs of both said AND gates being fed to the most significant bit element of the second register, said OR gate, said inverter and said AND gates producing during repetition of circulation a logic "1" bit pattern in the storage elements of the second register corresponding to all the digit positions of the display which are more significant than the most significant digit of the decimal number registered in the first register.

15. A numerical information output system as recited in claim 6 wherein there is provided means for establishing in said visual display the position of a decimal point in the number identified by the numerical information in said first shift register, further comprising:

counter means for storing the number of decimal places of a number to be displayed and identified by the numerical information in said first shift register;

means for adjusting the count in said counter means in synchronism with the shifting of said second shift register; and means responsive to a predetermined count of said counter means for controlling said developing means to develop numerical information of the second format indicative of digit positions to be displayed in accordance with the decimal point position in the number identified by the numerical information of said first shift register.

* * * * *